(12) United States Patent
Jin et al.

(10) Patent No.: US 11,824,457 B2
(45) Date of Patent: Nov. 21, 2023

(54) POWER CONVERSION MODULE

(71) Applicant: Delta Electronics, Inc., Taoyuan (TW)

(72) Inventors: Da Jin, Taoyuan (TW); Yang Leng, Taoyuan (TW); Litao Qian, Taoyuan (TW); Zhongwang Yang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/709,049

(22) Filed: Mar. 30, 2022

(65) Prior Publication Data
US 2022/0321017 A1    Oct. 6, 2022

(30) Foreign Application Priority Data

Apr. 1, 2021 (CN) .......................... 202110358287.5

(51) Int. Cl.
*H02M 3/335* (2006.01)
*H02M 1/00* (2006.01)

(52) U.S. Cl.
CPC ..... *H02M 3/33576* (2013.01); *H02M 1/0064* (2021.05)

(58) Field of Classification Search
CPC ............. H02M 3/335; H02M 3/33569; H02M 3/33576; H02M 1/0064
See application file for complete search history.

(56) References Cited

U.S. PATENT DOCUMENTS

| | | | |
|---|---|---|---|
| 2016/0062428 A1* | 3/2016 | Zeng | G06F 1/26 713/300 |
| 2017/0309391 A1* | 10/2017 | Eicher | H02M 3/33592 |
| 2019/0089259 A1 | 3/2019 | Chow et al. | |
| 2022/0319759 A1* | 10/2022 | Jin | H01F 27/26 |
| 2022/0352826 A1* | 11/2022 | Leng | H02M 1/40 |
| 2023/0075167 A1* | 3/2023 | Jin | H01F 27/306 |

FOREIGN PATENT DOCUMENTS

| | | |
|---|---|---|
| CN | 111478587 A | 7/2020 |
| CN | 109390118 B | 6/2021 |

* cited by examiner

*Primary Examiner* — Adolf D Berhane
(74) *Attorney, Agent, or Firm* — KIRTON McCONKIE; Evan R. Witt

(57) ABSTRACT

A power conversion module is disclosed. The power conversion module includes a power conversion module includes a circuit board and a first basic power unit. The first basic power unit is disposed on the circuit board and includes a magnetic device, a primary switch circuit, a first secondary rectifying circuit and a first positive output terminal pin. The primary switch circuit, the first secondary rectifying circuit, the magnetic device and the first positive output terminal pin are sequentially arranged on the circuit board along a first direction.

20 Claims, 20 Drawing Sheets

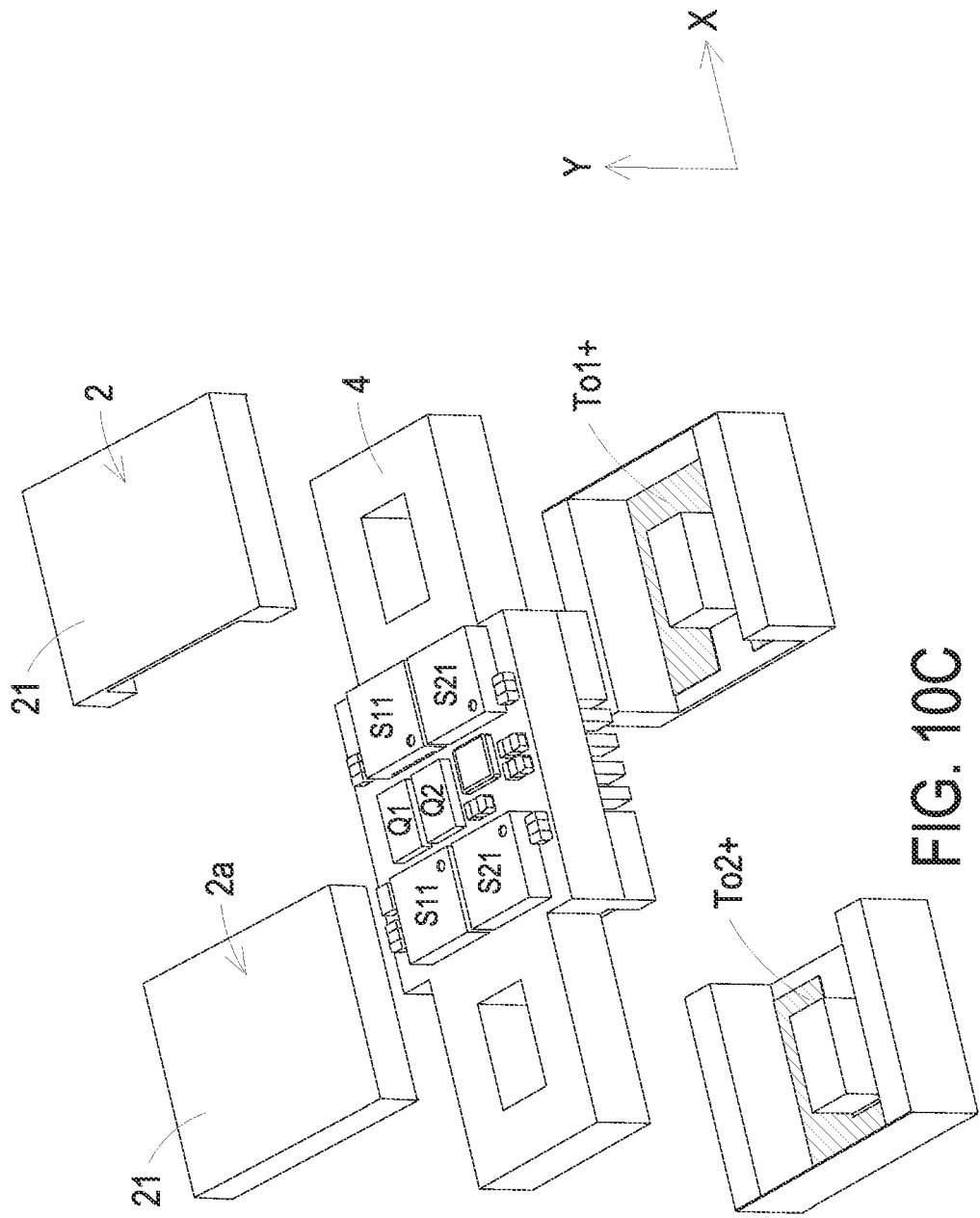

POWER CONVERSION MODULE

CROSS-REFERENCE TO RELATED APPLICATION

This application claims priority to China Patent Application No. 202110358287.5, filed on Apr. 1, 2021. The entire content of the above-mentioned patent application is incorporated herein by reference for all purposes.

FIELD OF THE INVENTION

The present disclosure relates to a technical field of power electronic circuit, and more particularly to a power conversion module.

BACKGROUND OF THE INVENTION

Nowadays, power electronic devices are widely used in power, electronics, electrical machinery and energy industries for converting electric power. It is an important issue for those skilled in the art to ensure the long-term stable operations of the power electronic devices and improve the power conversion efficiency of the power electronic devices.

With the rapid development of mobile communication technologies and cloud computing technologies, high-power DC/DC power conversion modules have also been widely used in communication products. Due to the high power and the tendency of miniaturizing the products, it is a challenge for the power conversion modules to increase the power conversion efficiency and reduce the volume.

Generally, the power conversion module is divided into a two-stage conversion structure and a single-stage conversion structure. The two-stage conversion structure has low efficiency, and the applications of the two-stage conversion structure are limited. In comparison with the two-stage conversion structure, the single-stage conversion structure has the advantages of high efficiency and flexible application. Consequently, the single-stage conversion structure is widely used in the power conversion module.

However, the conventional power conversion module with the single-stage conversion structure still has some drawbacks. For example, due to the layout of the circuitry structure, the size of the conventional power conversion module is large. Consequently, the conventional power conversion module is not suitably applied to a long-sized and high-density electronic device (e.g., a display card or an ASIC card).

Moreover, the conventional power conversion module is usually equipped with a magnetic device. The magnetic device is used as an inductor or a transformer. Due to the structure of the magnetic core and the winding method of the winding assembly, the power loss of the magnetic device of the conventional power conversion module is large. That is, the performance of the conventional power conversion module is not satisfied. Moreover, the ripple of the AC current generated by the magnetic device of the conventional power conversion module is large, and the capability of withstanding magnetic saturation is low.

SUMMARY OF THE INVENTION

The present disclosure provides a power conversion module to address the issues including that the conventional power conversion module is not suitably applied to a long-sized and high-density electronic device, the power loss of the magnetic device of the conventional power conversion module is large, the performance of the conventional power conversion module is not satisfied, the ripple of the AC current generated by the magnetic device of the conventional power conversion module is large, and the capability of withstanding magnetic saturation is low.

In accordance with an aspect of the present disclosure, a power conversion module is provided. The power conversion module includes a circuit board and a first basic power unit. The first basic power unit is disposed on the circuit board and includes a magnetic device, a primary switch circuit, a first secondary rectifying circuit and a first positive output terminal pin. The primary switch circuit, the first secondary rectifying circuit, the magnetic device and the first positive output terminal pin are sequentially arranged on the circuit board along a first direction.

From the above descriptions, the present disclosure provides the power conversion module. In the magnetic device of the power conversion module, the magnetic resistance of each of the second magnetic leg and the fourth magnetic leg is greater than the magnetic resistance of each of the first magnetic leg and the third magnetic leg. The projection of the primary winding, the projection of the first secondary winding and the projection of the second secondary winding are partially overlapped with each other in the connection region. Consequently, the ripple of the AC current flowing through the primary winding, the first secondary winding and the second secondary winding is reduced, and the capability of withstanding magnetic saturation is enhanced.

The above contents of the present disclosure will become more readily apparent to those ordinarily skilled in the art after reviewing the following detailed description and accompanying drawings, in which:

BRIEF DESCRIPTION OF THE DRAWINGS

FIG. 10C is a schematic exploded view illustrating the power conversion module as shown in FIG. 10A;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
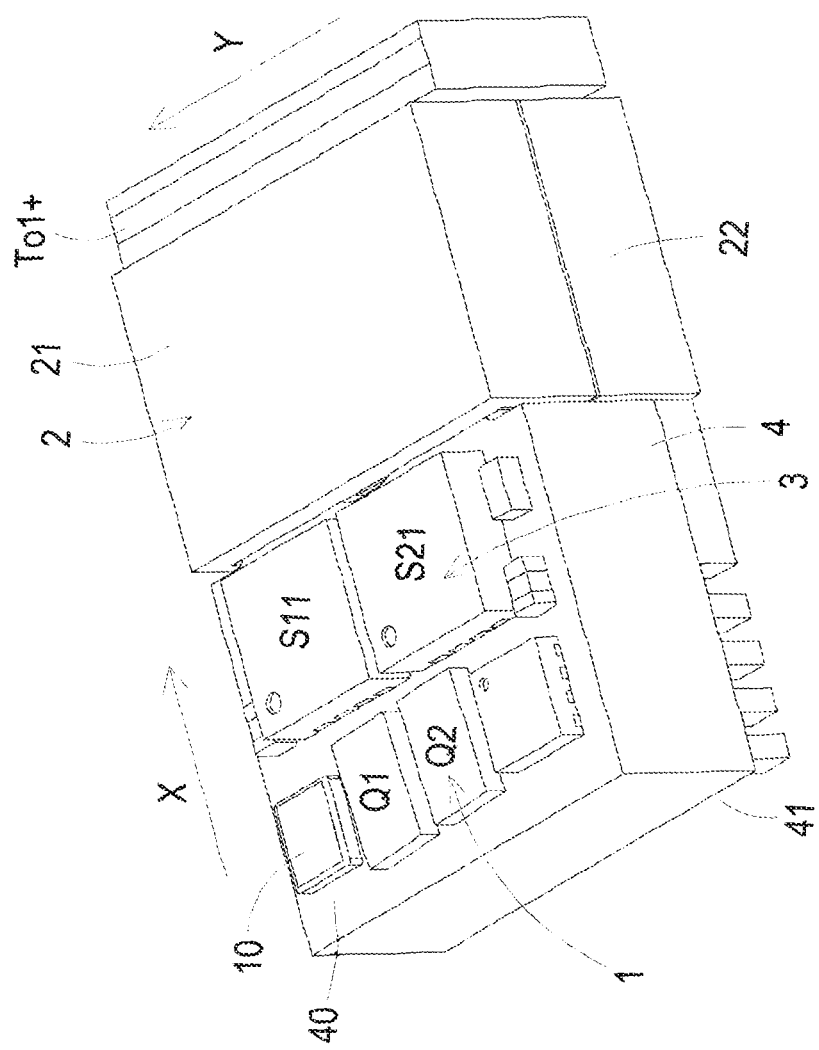
FIG. 1A is a schematic perspective view illustrating a power conversion module according to a first embodiment of the present disclosure.
Figure 1B:
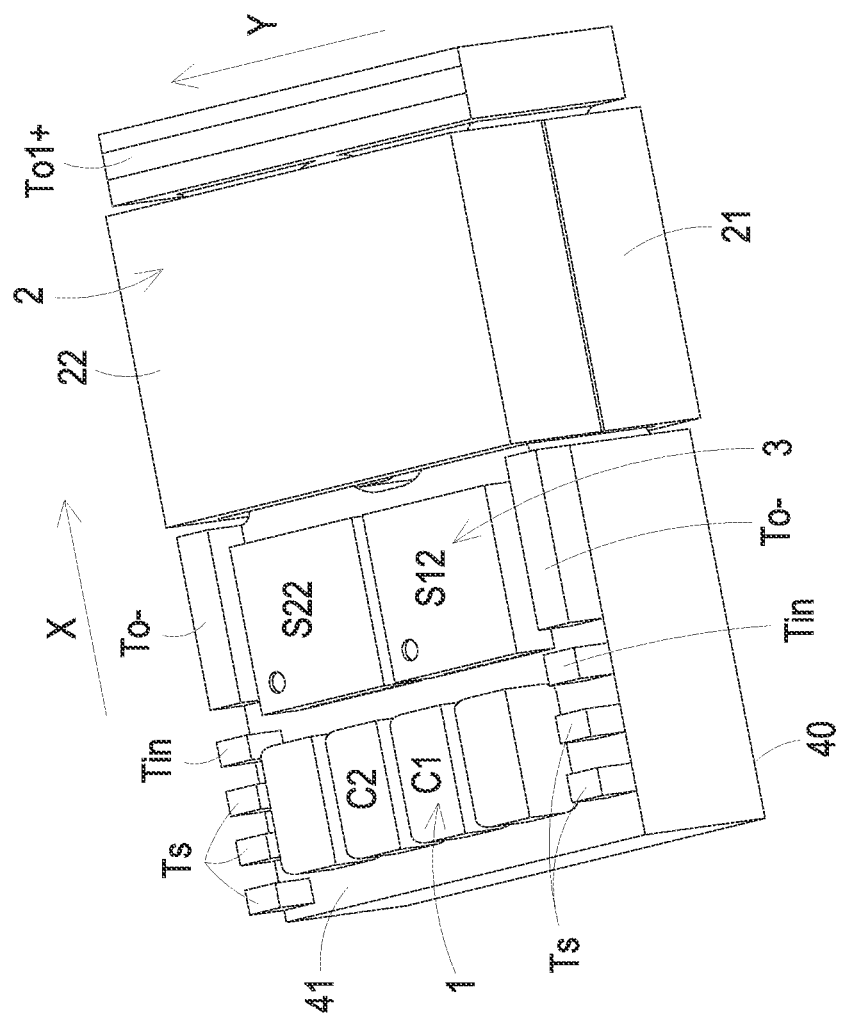
FIG. 1B is a schematic perspective view illustrating the power conversion module as shown in FIG. 1A and taken along another viewpoint.
Figure 2:
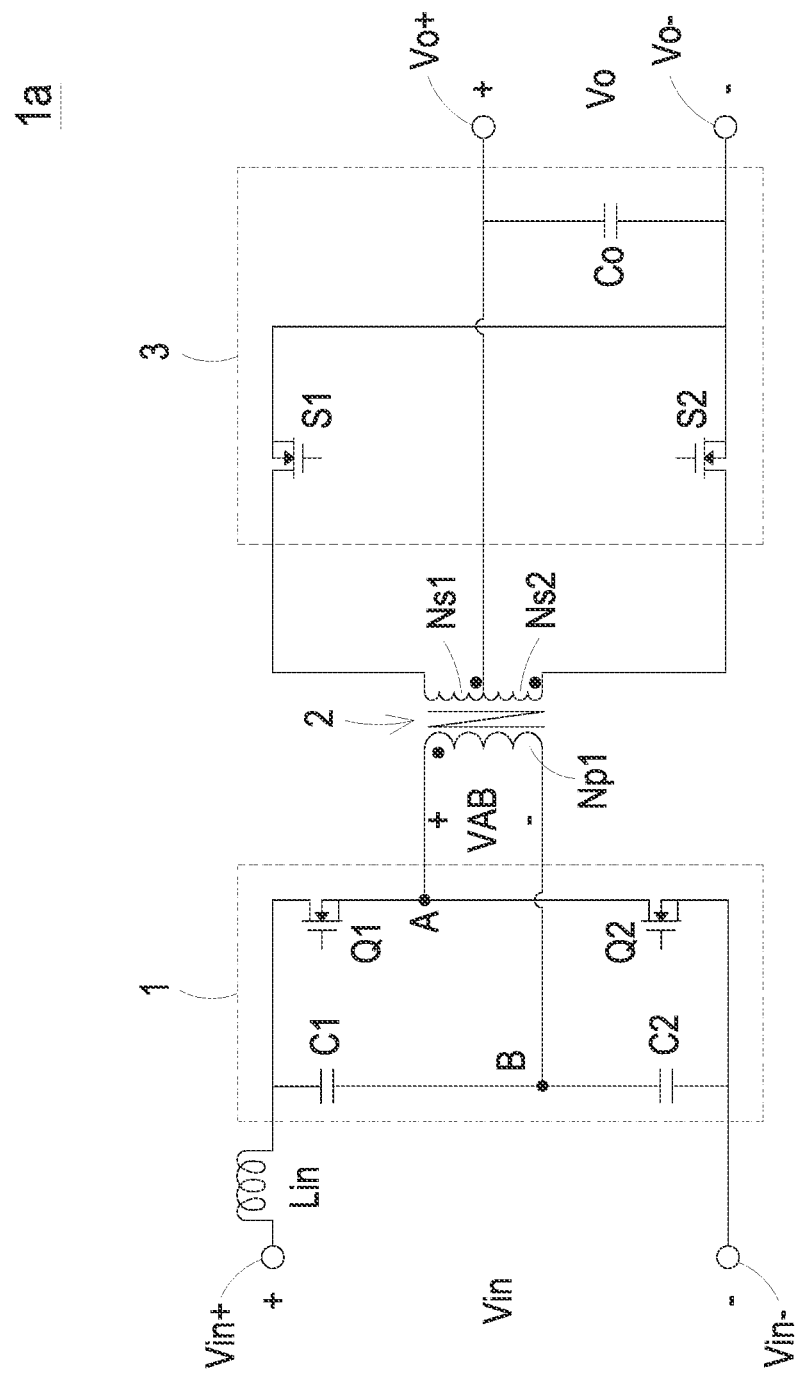
FIG. 2 is a schematic circuit diagram illustrating the circuitry topology of the power conversion module as shown in FIG. 1A.
Figure 3:
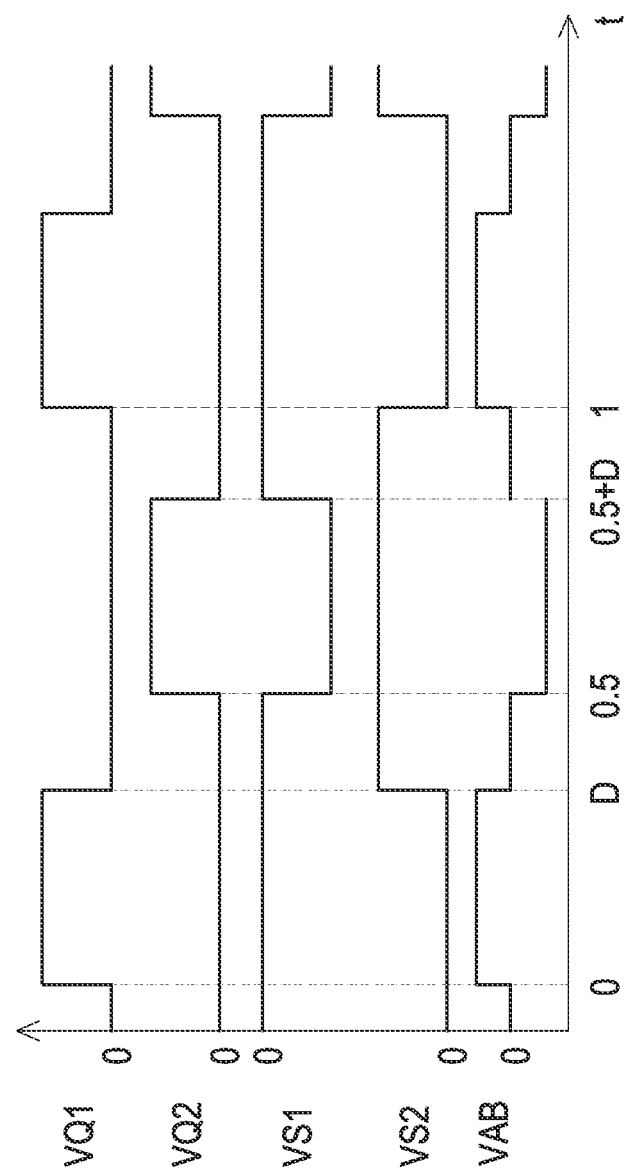
FIG. 3 is a schematic timing waveform diagram illustrating the voltage signals of the power conversion module as shown in FIG. 1A.
Figure 4:
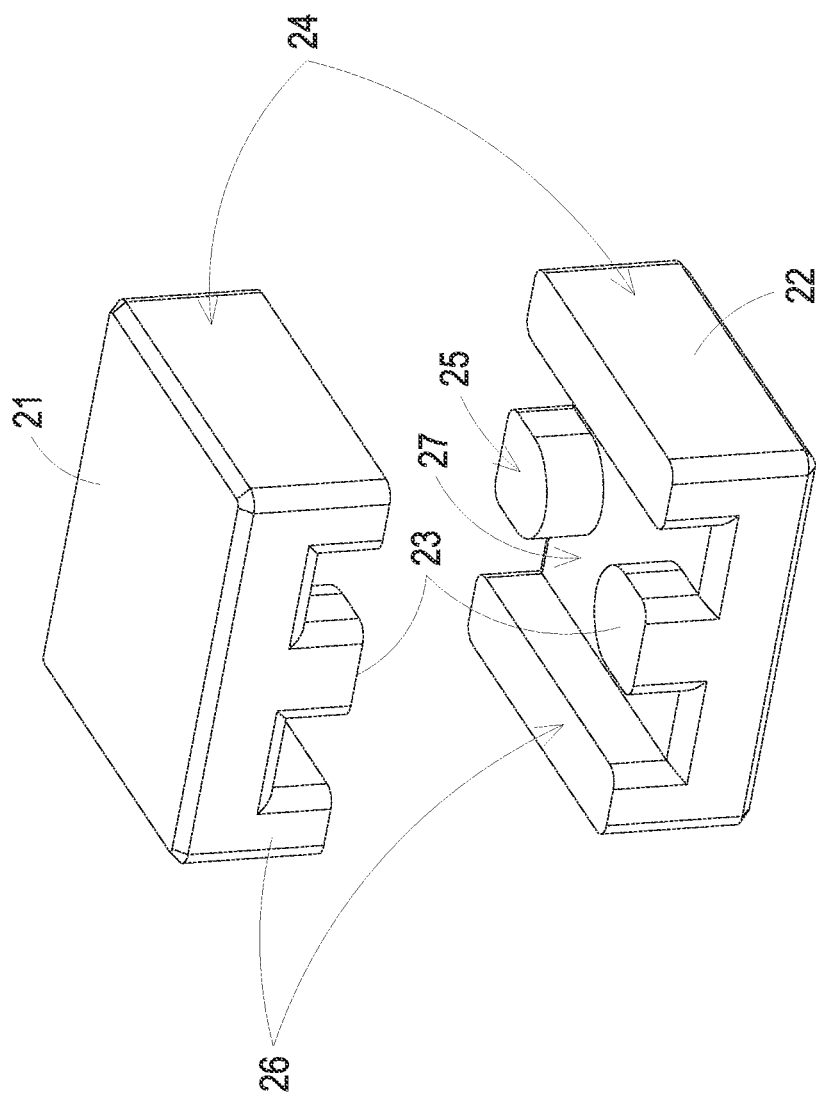
FIG. 4 is a schematic exploded view illustrating a magnetic core assembly of the magnetic device of the power conversion module as shown in FIG. 1A.
Figure 5:
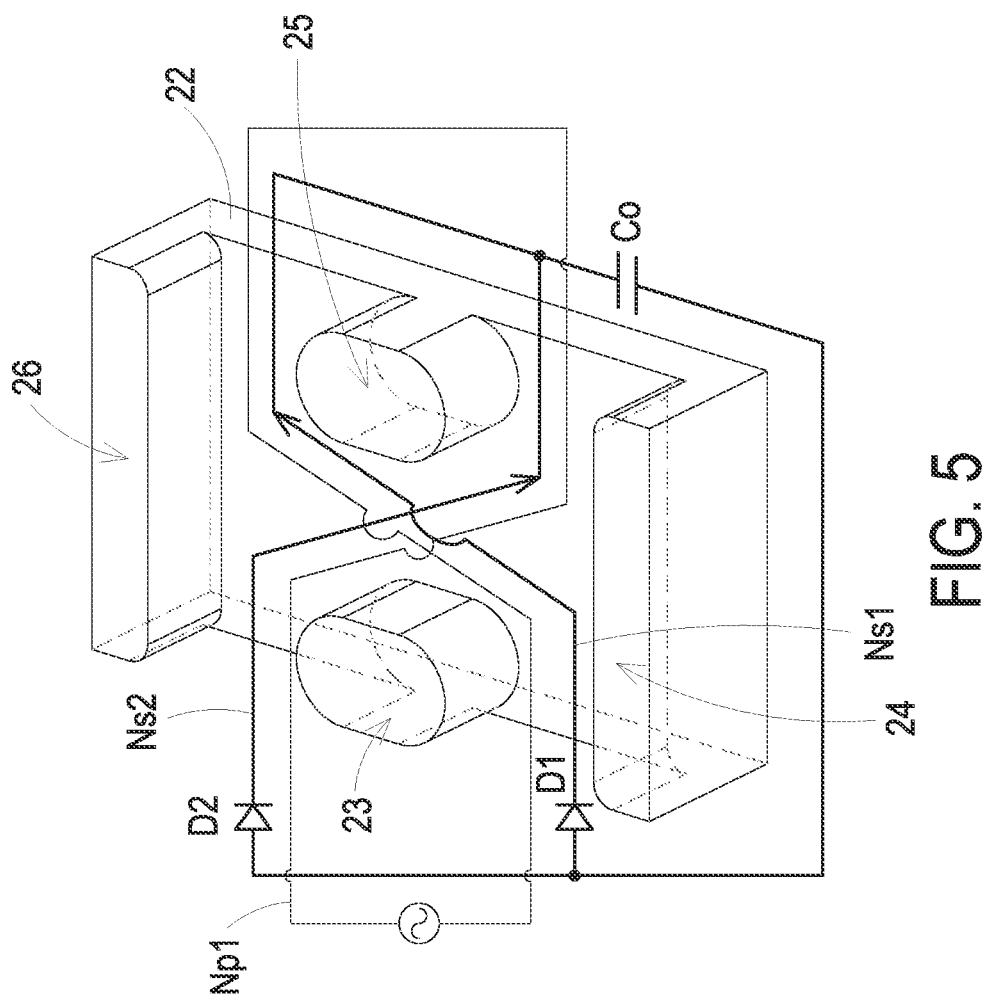
FIG. 5 schematically illustrates the magnetic device of the power conversion module as shown in FIG. 1A, in which the first magnetic cover is omitted.

FIG. 1A is a schematic perspective view illustrating a power conversion module according to a first embodiment of the present disclosure. FIG. 1B is a schematic perspective view illustrating the power conversion module as shown in FIG. 1A and taken along another viewpoint. FIG. 2 is a schematic circuit diagram illustrating the circuitry topology of the power conversion module as shown in FIG. 1A. FIG. 3 is a schematic timing waveform diagram illustrating the voltage signals of the power conversion module as shown in FIG. 1A. FIG. 4 is a schematic exploded view illustrating a magnetic core assembly of the magnetic device of the power conversion module as shown in FIG. 1A. FIG. 5 schematically illustrates the magnetic device of the power conversion module as shown in FIG. 1A, in which the first magnetic cover is omitted.

The circuitry topology of the power conversion module 1a of this embodiment is shown in FIG. 2, i.e., the power conversion module 1a is a single-stage conversion structure. The power conversion module 1a receives an input voltage Vin through a positive input terminal Vin+ and a negative input terminal Vin−. The power conversion module 1a outputs an output voltage Vo from a positive output terminal Vo+ and a negative output terminal Vo−. Moreover, the power conversion module 1a includes a primary switching circuit 1, a first magnetic device 2 and a first secondary rectifying circuit 3.

The primary switching circuit 1 includes a switch bridge arm. The primary switching circuit 1 is a half-bridge circuit. The switch bridge arm includes a first switch Q1 and a second switch Q2 electrically connected in series. The first switch Q1 and the second switch Q2 are connected with a midpoint A of the switch bridge arm.

In some embodiments, the primary switching circuit 1 further includes a capacitor bridge arm. The power conversion module 1a further includes an input inductor Lin. The capacitor bridge arm and the switch bridge arm are connected with each other in parallel. The capacitor bridge arm includes a first capacitor C1 and a second capacitor C2. The first capacitor C1 and the second capacitor C2 are electrically connected in series with a midpoint B of the capacitor bridge arm. The first terminal of the input inductor Lin is electrically connected with the positive input terminal Vin+ of the power conversion module 1a. The second terminal of the input inductor Lin is electrically connected with the first terminal of the switch bridge arm and the first terminal of the capacitor bridge arm. Moreover, the negative input terminal Vin− of the power conversion module 1a is electrically connected with the second terminal of the switch bridge arm and the second terminal of the capacitor bridge arm.

The first magnetic device 2 includes a magnetic core assembly 20, a primary winding Np1, a first secondary winding Ns1 and a second secondary winding Ns2. The first terminal of the primary winding Np1 is electrically connected with the midpoint A of the switch bridge arm. The second terminal of the primary winding Np1 is electrically connected with the midpoint B of the capacitor bridge arm. The first secondary winding Ns1 and the second secondary winding Ns2 are electromagnetically coupled to the primary winding Np1. The first secondary winding Ns1 and the second secondary winding Ns2 have a first terminal and a second terminal, respectively. The second terminal of the first secondary winding Ns1, the first terminal of the second secondary winding Ns2 and the first terminal of the primary winding Np1 are common-polarity terminals. The second terminal of the first secondary winding Ns1 and the second terminal of the second secondary winding Ns2 are the opposed-polarity terminals. In addition, the second terminal of the first secondary winding Ns1 and the second terminal of the second secondary winding Ns2 are electrically connected with each other and collaboratively formed as a center-tap point.

The first secondary rectifying circuit 3 includes a first rectifier assembly S1, a second rectifier assembly S2 and an output capacitor Co. In an embodiment, each of the first rectifier assembly S1 and the second rectifier assembly S2 includes at least one rectifier element such as a metal-oxide-semiconductor field-effect transistor (MOSFET) or a diode. In another embodiment, each of the first rectifier assembly S1 and the second rectifier assembly S2 includes a plurality of MOSFETs connected in parallel.

In the following embodiments, each of the first rectifier assembly S1 and the second rectifier assembly S2 includes a plurality of MOSFETs connected in parallel. The first terminal of the first rectifier assembly S1 is electrically connected with the first terminal of the second rectifier assembly S2. The first terminal of the first rectifier assembly S1 and the first terminal of the second rectifier assembly S2 are the same electrodes (e.g., the source terminal). The second terminal (e.g., the drain terminal) of the first rectifier assembly S1 is electrically connected with the first terminal of the first secondary winding Ns1. The second terminal (e.g., the drain terminal) of the second rectifier assembly S2 is electrically connected with the first terminal of the second secondary winding Ns2. Consequently, the first rectifier assembly S1, the second rectifier assembly S2, the first secondary winding Ns1 and the second secondary winding Ns2 are collaboratively formed as an electrically closed loop. The first terminal of the output capacitor Co is electrically connected with the center-tap point and the positive output terminal Vo+ of the power conversion module 1a. The second terminal of the output capacitor Co is electrically connected with the first terminal of the first rectifier assembly S1, the first terminal of the second rectifier assembly S2 and the negative output terminal Vo− of the power conversion module 1a.

Please refer to FIG. 3. In some embodiments, the phase difference between the driving signal VQ1 for controlling the first switch Q1 and the driving signal VQ2 for controlling the first switch Q2 is 180 degrees. The duty cycle D of the driving signal VQ1 and the duty cycle D of the driving signal VQ2 are nearly equal. The driving signal VS1 for controlling the first rectifier assembly S1 is complementary to the driving signal VQ2. The driving signal VS2 for controlling the second rectifier assembly S2 is complementary to the driving signal VQ1.

In an embodiment, the terminal voltage VAB across the first terminal and the second terminal of the primary winding Np1 (or the voltage between the midpoint A of the switch bridge arm and the midpoint B of the capacitor bridge arm) is a three-level AC voltage. That is, the terminal voltage VAB has three voltage levels, including the positive input voltage (+Vin), 0 and the negative input voltage (−Vin). In another embodiment, the duty cycle D of each of the driving signal VQ1 and the driving signal VQ2 is close to or equal to 50%, and the terminal voltage VAB is a two-level AC voltage. That is, the terminal voltage VAB has two voltage levels, including a half of the positive input voltage (+Vin/2) and a half of the negative input voltage (−Vin/2).

It is noted that numerous modifications and alterations may be made while retaining the teachings of the disclosure. For example, in another embodiment, the capacitor bridge arm is replaced by an additional switch bridge arm. Consequently, the primary switching circuit 1 has a full-bridge circuit. The additional switch bridge arm includes an additional first switch and an additional second switch. As long as the terminal voltage VAB is a two-level AC voltage or a three-level AC voltage, the methods for controlling the switches of the switch bridge arm and the additional switch bridge arm are not restricted.

Please refer to FIGS. 4 and 5. The magnetic core assembly 20 includes a first magnetic cover 21, a second magnetic cover 22, a first magnetic leg 23, a second magnetic leg 24, a third magnetic leg 25 and a fourth magnetic leg 26. The first magnetic leg 23 and the third magnetic leg 25 are opposed to each other. In addition, the first magnetic leg 23 and the third magnetic leg 25 are disposed between the first magnetic cover 21 and the second magnetic cover 22. The second magnetic leg 24 and the fourth magnetic leg 26 are opposed to each other. In addition, the second magnetic leg 24 and the fourth magnetic leg 26 are disposed between the first magnetic cover 21 and the second magnetic cover 22. The first magnetic leg 23 and the third magnetic leg 25 are disposed between the second magnetic leg 24 and the fourth magnetic leg 26. The magnetic resistance of each of the second magnetic leg 24 and the fourth magnetic leg 26 is greater than the magnetic resistance of each of the first magnetic leg 23 and the third magnetic leg 25. In addition, a connection region 27 is defined by a region formed by the first magnetic leg 23, the second magnetic leg 24, the third magnetic leg 25 and the fourth magnetic leg 26.

It is noted that the magnetic core assembly may be varied. In the following embodiments, the magnetic core assembly also includes the first magnetic cover and the second magnetic cover. However, the number of magnetic legs, the positions of the magnetic legs and the winding methods of the windings are modified. For succinctness, only one of the first magnetic cover and the second magnetic cover is shown.

The primary winding Np1 is wound around the first magnetic leg 23 and the third magnetic leg 25 through the connection region 27. The direction of the magnetic flux passing through the first magnetic leg 23 and the direction of the magnetic flux passing through the third magnetic leg 25 are opposite. The first terminal of the first secondary winding Ns1 is disposed between the first magnetic leg 23 and the second magnetic leg 24. The second terminal of the first secondary winding Ns1 is disposed between the third magnetic leg 25 and the fourth magnetic leg 26. The first terminal of the second secondary winding Ns2 is disposed between the first magnetic leg 23 and the fourth magnetic leg 26. The second terminal of the second secondary winding Ns2 is disposed between the second magnetic leg 24 and the third magnetic leg 25.

As mentioned above, the magnetic resistance of each of the second magnetic leg 24 and the fourth magnetic leg 26 is greater than the magnetic resistance of each of the first magnetic leg 23 and the third magnetic leg 25. The primary winding Np1 is wound around the first magnetic leg 23 and the third magnetic leg 25 through the connection region 27. The first terminal of the first secondary winding Ns1 is disposed between the first magnetic leg 23 and the second magnetic leg 24. The second terminal of the first secondary winding Ns1 is disposed between the third magnetic leg 25 and the fourth magnetic leg 26. The first terminal of the second secondary winding Ns2 is disposed between the first magnetic leg 23 and the fourth magnetic leg 26. The second terminal of the second secondary winding Ns2 is disposed between the second magnetic leg 24 and the third magnetic leg 25. In other words, the projection of the primary winding Np1, the projection of the first secondary winding Ns1 and the projection of the second secondary winding Ns2 are partially overlapped with each other in the connection region 27. Consequently, the ripple of the AC current flowing through the primary winding Np1, the first secondary winding Ns1 and the second secondary winding Ns2 is reduced, and the capability of withstanding magnetic saturation is enhanced.

In an embodiment, the second magnetic leg 24 and the fourth magnetic leg 26 have air gaps, but the first magnetic leg 23 and the third magnetic leg 25 have no air gaps. In another embodiment, the second magnetic leg 24 and the fourth magnetic leg 26 have air gaps, and the first magnetic leg 23 and the third magnetic leg 25 also have air gaps. However, the air gap of each of the second magnetic leg 24 and the fourth magnetic leg 26 is longer than the air gap of each of the first magnetic leg 23 and the third magnetic leg 25. It is noted that the positions of the air gaps are not restricted. For example, the air gap is located at an upper portion of the corresponding magnetic leg and located near the first magnetic cover 21, or the air gap is located at a lower portion of the corresponding magnetic leg and located near the second magnetic cover 22, or the air gap is located at a middle region of the corresponding magnetic leg.

In an embodiment, the primary winding Np1 is wound around the first magnetic leg 23 and the third magnetic leg 25 in an 8-shaped form through the connection region 27. Consequently, the direction of the magnetic flux passing through the first magnetic leg 23 and the direction of the magnetic flux passing through the third magnetic leg 25 are opposite. For example, the primary winding Np1 is sequentially transported through the region between the first magnetic leg 23 and the fourth magnetic leg 26, the connection region 27, the region between the second magnetic leg 24 and the third magnetic leg 25, the outer side of the third magnetic leg 25, the region between the third magnetic leg 25 and the fourth magnetic leg 26, the connection region 27, the region between the first magnetic leg 23 and the second magnetic leg 24 and the outer side of the first magnetic leg 23. In other words, the first terminal of the primary winding Np1 is disposed between the first magnetic leg 23 and the fourth magnetic leg 26, and the second terminal of the primary winding Np1 is disposed between the first magnetic leg 23 and the second magnetic leg 24. Moreover, the first terminal and the second terminal of the primary winding Np1 are located at the same side of the magnetic core assembly 20. It is noted that the method of winding the primary winding Np1 is not restricted. For example, a first portion of the primary winding Np1 is wound around the first magnetic leg 23, a second portion of the primary winding Np1 is transported through the connection region 27, and a third portion of the primary winding Np1 wound around the third magnetic leg 25.

The projection of the first secondary winding Ns1 and the projection of the second secondary winding Ns2 in the connection region 27 are overlapped with each other. The first terminal of the first secondary winding Ns1 and the first terminal of the second secondary winding Ns2 are located at the same side of the magnetic core assembly 20, adjacent to the first magnetic leg 23 and electrically connected with each other through the first rectifier assembly S1 and the second rectifier assembly S2. Especially, the first terminal of the primary winding Np1, first terminal of the first secondary winding Ns1 and the first terminal of the second secondary winding Ns2 are located at the same side of the magnetic device 2.

As shown in FIG. 2, the direction of the current flowing through the first secondary winding Ns1 is limited by the first rectifier assembly S1, and the direction of the current flowing through the second secondary winding Ns2 is limited by the second rectifier assembly S2. Consequently, the direction of the current flowing through the first secondary winding Ns1 and the direction of the current flowing through the second secondary winding Ns2 are identical. That is, the current in the first secondary winding Ns1 flows from the first terminal to the second terminal, and the current in the second secondary winding Ns2 flows from the first terminal to the second terminal.

Each of the first rectifier assembly S1 and the second rectifier assembly S2 includes at least one MOSFET, or at least one IGBT, or at least one diode. In the embodiment of FIG. 5, the first rectifier assembly S1 and the second rectifier assembly S2 are represented by diodes D1 and D2, respectively. In FIG. 5, the direction of the current is represented by an arrow. That is, the current in the first secondary winding Ns1 flows from the first terminal to the second terminal, and the current in the second secondary winding Ns2 flows from the first terminal to the second terminal.

There is a first voltage across the first terminal and the second terminal of the first secondary winding Ns1. There is a second voltage across the first terminal and the second terminal of the second secondary winding Ns2. Moreover, the phase difference between the first voltage and the second voltage is 180 degrees. Consequently, the currents flowing through the first secondary winding Ns1 and the second secondary winding Ns2 generate AC magnetic fluxes on the first magnetic leg 23 and the third magnetic leg 25, respectively. The direction of the AC magnetic flux passing through the first magnetic leg 23 and the direction of the AC magnetic flux passing through the third magnetic leg 25 are opposite. The amplitude of the AC magnetic flux passing through the first magnetic leg 23 and the amplitude of the AC magnetic flux passing through the third magnetic leg 25 are calculated by cancelling out the AC magnetic fluxes generated by the current flowing through the first secondary winding Ns1 on the corresponding magnetic legs and the AC magnetic fluxes generated by the current flowing through the second secondary winding Ns2 on the corresponding magnetic legs according to the phase. The amplitude of the AC magnetic flux passing through the first magnetic leg 23 and the amplitude of the AC magnetic flux passing through the third magnetic leg 25 are nearly equal. Consequently, the AC magnetic fluxes generated by the first secondary winding Ns1 and the second secondary winding Ns2 are superposed and evenly distributed to the second magnetic leg 24 and the fourth magnetic leg 26, wherein the directions of the AC magnetic fluxes generated on the second magnetic leg 24 and the fourth magnetic leg 26 are opposite. Moreover, the DC magnetic fluxes generated by the first secondary winding Ns1 and the second secondary winding Ns2 are cancelled out on the first magnetic leg 23, and the DC magnetic fluxes generated by the first secondary winding Ns1 and the second secondary winding Ns2 are cancelled out on the third magnetic leg 25. Moreover, the capacitor bridge arm of the primary switching circuit 1 has the function of blocking the DC component of the current. Due to the arrangement of the capacitor bridge arm, the DC component of the current flowing through the first secondary winding Ns1 and the DC component of the current flowing through the second secondary winding Ns2 are nearly equal. For brevity, the DC component of the current is also referred as a DC current. Consequently, the DC magnetic fluxes passing through each of the first magnetic leg 23 and the third magnetic leg 25 are nearly zero. Moreover, the DC magnetic flux corresponding to the DC current flowing through the first secondary winding Ns1 and the DC magnetic flux corresponding to the DC current flowing through the second secondary winding Ns2 are superposed. The superposed DC magnetic flux is applied across the second magnetic leg 24 and the fourth magnetic leg 26. The air gaps of the second magnetic leg 24 and the fourth magnetic leg 26 can avoid the saturation of the second magnetic leg 24 and the fourth magnetic leg 26.

As mentioned above, due to the arrangement of the capacitor bridge arm of the primary switching circuit 1, the DC current flowing through the first secondary winding Ns1 and the DC current flowing through the second secondary winding Ns2 are nearly equal. In other words, the arrangement of the capacitor bridge arm is a current-sharing method. It is noted that the current-sharing method is not restricted. For example, in accordance with another current-sharing method, a blocking capacitor (not shown) is serially connected with the primary winding Np1. Due to the arrangement of the blocking capacitor, the DC current flowing through the first secondary winding Ns1 and the DC current flowing through the second secondary winding Ns2 are nearly equal. In accordance with a further current-sharing method, a current-sharing circuit (not shown) is provided to achieve the similar function. At least one of the above three current-sharing method is applicable to the power conversion module 1a.

In case that the DC current flowing through the first secondary winding Ns1 and the DC current flowing through the second secondary winding Ns2 are not equal, the DC magnetic fluxes passing through each of the first magnetic leg 23 and the third magnetic leg 25 cannot cancel out each other. Consequently, the first magnetic leg 23 and the third magnetic leg 25 are readily subjected to the magnetic saturation. In some embodiments, the first magnetic leg 23 and the third magnetic leg 25 have air gaps to avoid the magnetic saturation of the first magnetic leg 23 and the third magnetic leg 25.

Moreover, the AC magnetic flux of the first magnetic leg 23 is large, but the air gap and the magnetic resistance of the first magnetic leg 23 are small. When compared with the first magnetic leg 23, the air gap and the magnetic resistance of the second magnetic leg 24 are larger. Since the AC magnetic flux on the second magnetic leg 24 is smaller, the ripple of the AC current of the first secondary winding Ns1 is lower, and the equivalent inductance of the first secondary winding Ns1 is higher. Similarly, the AC magnetic flux of the third magnetic leg 25 is large, but the air gap and the magnetic resistance of the third magnetic leg 25 are small. When compared with the third magnetic leg 25, the air gap and the magnetic resistance of the fourth magnetic leg 26 are larger. Since the AC magnetic flux on the fourth magnetic leg 26 is smaller, the ripple of the AC current of the second secondary winding Ns2 is lower, and the equivalent inductance of the second secondary winding Ns2 is higher. Since the primary winding Np1 is magnetically coupled with the first secondary winding Ns1 and the second secondary winding Ns2, the ripple of the AC current of the primary winding Np1 is also decreased. Moreover, since the ripple of the current flowing through the switch bridge arm of the primary switch circuit 1 is decreased, the switching loss is decreased. By using the magnetic device of the power conversion module 1a, the ripple of the AC current is decreased, and the capability of withstanding magnetic saturation is enhanced.

In an embodiment, the whole magnetic core assembly 20 is made of the same material such as ferrite or iron powder. In another embodiment, the material of the magnetic core assembly 20 is specially determined. Preferably, the material of the first magnetic leg 23 and the third magnetic leg 25 is different from the material of the rest of the magnetic core assembly 20. For example, the first magnetic leg 23 and the third magnetic leg 25 are made of ferrite, and the rest of the magnetic core assembly 20 is made of iron powder with distributed-air-gap. Consequently, the core loss of the magnetic core assembly 20 is low, and the equivalent inductance of the first secondary winding Ns1 and the second secondary winding Ns2 of the magnetic core assembly 20 is high. In an embodiment, the total cross section area of the second magnetic leg 24 and the fourth magnetic leg 26 is greater than the total cross section area of the first magnetic leg 23 and the third magnetic leg 25. Moreover, the cross section area of the second magnetic leg 24 is substantially equal to the cross section area of the fourth magnetic leg 26, wherein the error tolerance thereof is within ±20%. The cross section area of the first magnetic leg 23 is substantially equal to the cross section area of the third magnetic leg 25, wherein the error tolerance thereof is within ±20%. The error tolerance mentioned above is within ±20%, which means that the comparison between the difference of the cross-sectional areas of the two magnetic legs and the cross-sectional area of one of the magnetic legs is within ±20%.

The three-dimensional structure of the power conversion module 1a will be illustrated as follows. Please refer to FIGS. 1A and 1B again. In this embodiment, the power conversion module 1a further includes a circuit board 4 and a first positive output terminal pin To1+. Preferably but not exclusively, the circuit board 4 is a multi-layered structure. The primary switching circuit 1, the first secondary rectifying circuit 3, the first magnetic device 2 and the first positive output terminal pin To1+ are collaboratively formed as a basic power unit. The basic power unit is disposed on the circuit board 4. At least one basic power unit is responsible for performing the power conversion. Consequently, the power conversion module outputs electric power. The primary switch circuit 1, the first secondary rectifying circuit 3, the first magnetic device 2 and the first positive output terminal pin To1+ are sequentially arranged on the circuit board 4 along a specified direction (e.g., along the X-axial direction as shown in FIG. 1A). The first positive output terminal pin To1+ is used as the positive output terminal Vo+. Moreover, the first positive output terminal pin To1+ is made of a conductor. For example, the first positive output terminal pin To1+ is a copper block.

As mentioned above, the primary switch circuit 1, the first secondary rectifying circuit 3, the first magnetic device 2 and the first positive output terminal pin To1+ are sequentially arranged along the X-axial direction of the circuit board 4. Consequently, the width of the power conversion module 1a along the Y-axial direction of the circuit board 4 is reduced. Consequently, the output current or the output power of the power conversion module 1a can be expanded. The power conversion module 1a has small size and high power density. Consequently, the power conversion module 1a is suitably applied to a long-sized and high-density electronic device (e.g., a display card or an ASIC card).

Please refer to FIG. 1A again. The primary switch circuit 1 is located at an edge region of the circuit board 4. The first switch Q1 and the second switch Q2 of the switch bridge arm of the primary switch circuit 1 are disposed on a first surface 40 of the circuit board 4. The first capacitor C1 and the second capacitor C2 of the capacitor bridge arm of the primary switch circuit 1 are disposed on a second surface 41 of the circuit board 4. The first surface 40 and the second surface 41 of the circuit board 4 are opposed to each other. In addition, the switch bridge arm and the capacitor bridge arm are aligned with each other on the circuit board 4. Moreover, the primary switch circuit 1 further includes a driver 10. The driver 10 is used to drive the first switch Q1 and the second switch Q2 of the switch bridge arm. The driver 10, the first switch Q1 and the second switch Q2 are sequentially arranged along the Y-axial direction of the circuit board 4, for example the driver 10 is arranged on the upper side of the first switch Q1 and the second switch Q2 as shown in FIG. 1A. The first positive output terminal pin To1+ is disposed on the first surface 40 and/or the second surface 41 of the circuit board 4.

In another embodiment, each of the first rectifier assembly S1 and the second rectifier assembly S2 includes a plurality of MOSFETs connected in parallel. For example, the first rectifier assembly S1 includes a first rectifier element S11 and a second rectifier element S12, which are electrically connected with each other in parallel. The second rectifier assembly S2 includes a first rectifier element S21 and a second rectifier element S22, which are electrically connected with each other in parallel. The first rectifier element S11 of the first rectifier assembly S1 and the first rectifier element S21 of the second rectifier assembly S2 are disposed on the first surface 40 of the circuit board 4. The second rectifier element S12 of the first rectifier assembly S1 and the second rectifier element S22 of the second rectifier assembly S2 are disposed on the second surface 41 of the circuit board 4. The projection of the first rectifier element S11 on the first surface 40 and the projection of the second rectifier element S12 on the first surface 40 are partially overlapped with each other, for example mirror symmetrical to the first surface 40 and the second surface 41 of the circuit board 4. The projection of the first rectifier element S21 on the first surface 40 and the projection of the second rectifier element S22 on the first surface 40 are partially overlapped with each other, for example mirror symmetrical to the first surface 40 and the second surface 41 of the circuit board 4.

The first magnetic cover 21 and the second magnetic cover 22 of the magnetic core assembly 20 are locked on the circuit board 4 through the first surface 40 and the second surface 41 of the circuit board 4. Moreover, the first magnetic leg 23, the second magnetic leg 24, the third magnetic leg 25 and the fourth magnetic leg 26 are penetrated through corresponding perforations (not shown) of the circuit board 4 and partially accommodated within the circuit board 4.

The circuit board 4 is a multi-layered circuit board. The primary winding Np1, the first secondary winding Ns1 and the second secondary winding Ns2 are sequentially disposed in different layers of the circuit board 4. In addition, the primary winding Np1, the first secondary winding Ns1 and the second secondary winding Ns2 are not aligned with each other. The second terminal of the first secondary winding Ns1 and the second terminal of the second secondary winding Ns2 are electrically connected with the first positive output terminal pin To1+ that is disposed on the second surface 41 of the circuit board 4.

In an embodiment, the power conversion module 1a further includes a plurality of input terminal pins Tin, a plurality of negative output terminal pins To− and a plurality of control and detection signal pins Ts. The plurality of input terminal pins Tin, the plurality of negative output terminal pins To− and the plurality of control and detection signal pins Ts are made of conductors (e.g., copper). In addition, these pins are disposed on the second surface 41 of the circuit board 4. For example, these pins are disposed on two opposite lateral regions of the second surface 41 of the circuit board 4 along the Y-axial direction. The plurality of negative output terminal pins To− are located beside the first rectifier assembly S1 and the second rectifier assembly S2 of the first secondary rectifying circuit 3. The plurality of control and detection signal pins Ts are located beside the first capacitor C1 and the second capacitor C2 of the capacitor bridge arm. Each input terminal pin Tin is disposed between the corresponding negative output terminal pin To− and the corresponding control detection signal pin Ts.

As mentioned above, the first switch Q1, the second switch Q2, the first rectifier element S11 of the first rectifier assembly S1, the first rectifier element S21 of the second rectifier assembly S2 and the first magnetic cover 21 of the magnetic core assembly 20 are disposed on the first surface 40 of the circuit board 4. In an embodiment, the top surface of the first switch Q1, the top surface of the second switch Q2, the top surface of the first rectifier element S11 of the first rectifier assembly S1, the top surface of the first rectifier element S21 of the second rectifier assembly S2 and the top surface of the first magnetic cover 21 are coplanar with each other. Due to this structural design, a heat dissipation device (e.g., a heat sink and/or a thermal conduction base) can be disposed on the top surface of the first switch Q1, the top surface of the second switch Q2, the top surface of the first rectifier element S11 of the first rectifier assembly S1, the top surface of the first rectifier element S21 of the second rectifier assembly S2 and the top surface of the first magnetic cover 21 more easily. Consequently, the thermal resistance between the first rectifier assembly S1 (or the second rectifier assembly S2 or the magnetic core assembly 20) and the heat dissipation device is largely reduced, and a lateral heat dissipation of the power conversion module 1a can be achieved.

Figure 6A:
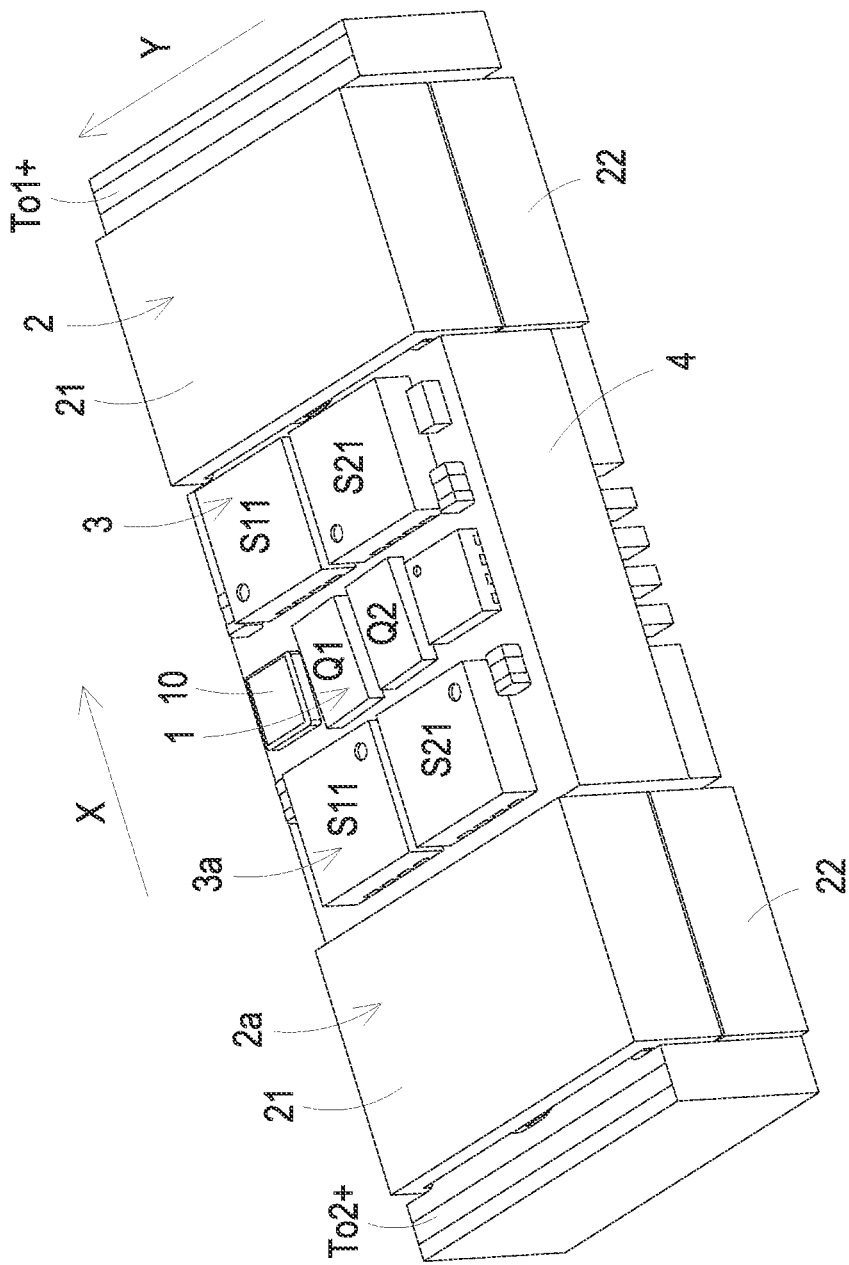
FIG. 6A is a schematic perspective view illustrating a power conversion module according to a second embodiment of the present disclosure.
Figure 6B:
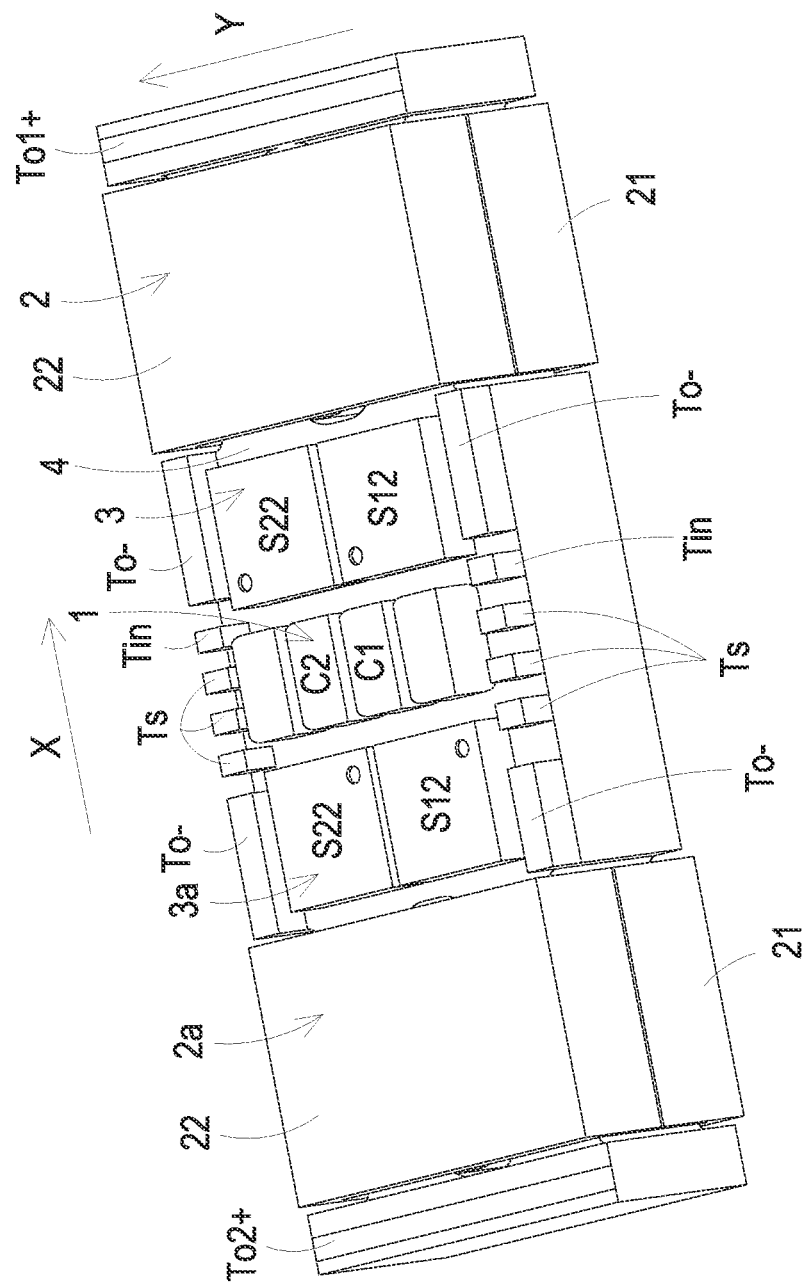
FIG. 6B is a schematic perspective view illustrating the power conversion module as shown in FIG. 6A and taken along another viewpoint.
Figure 7:
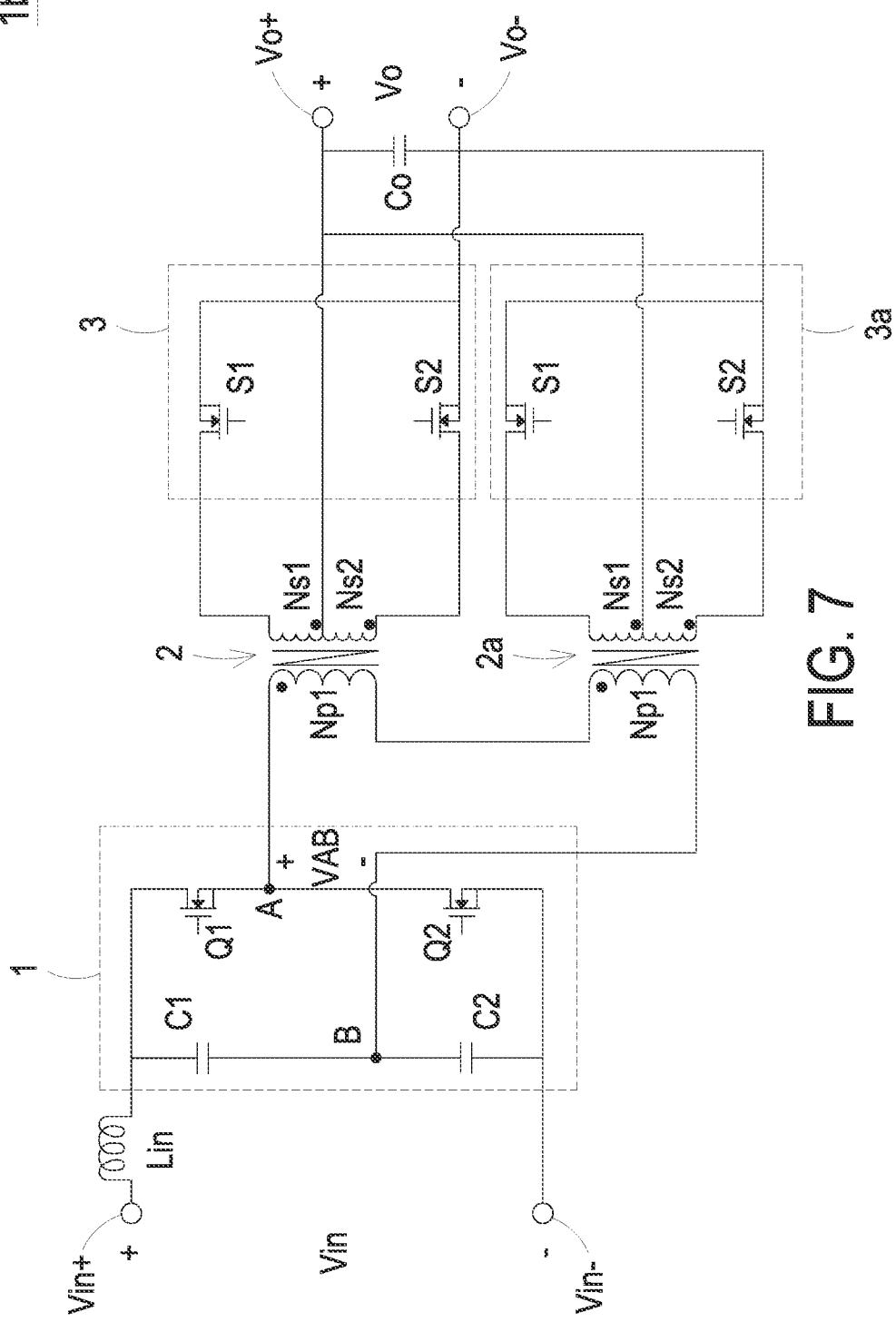
FIG. 7 is a schematic circuit diagram illustrating the circuitry topology of the power conversion module as shown in FIG. 6A.
Figure 8:
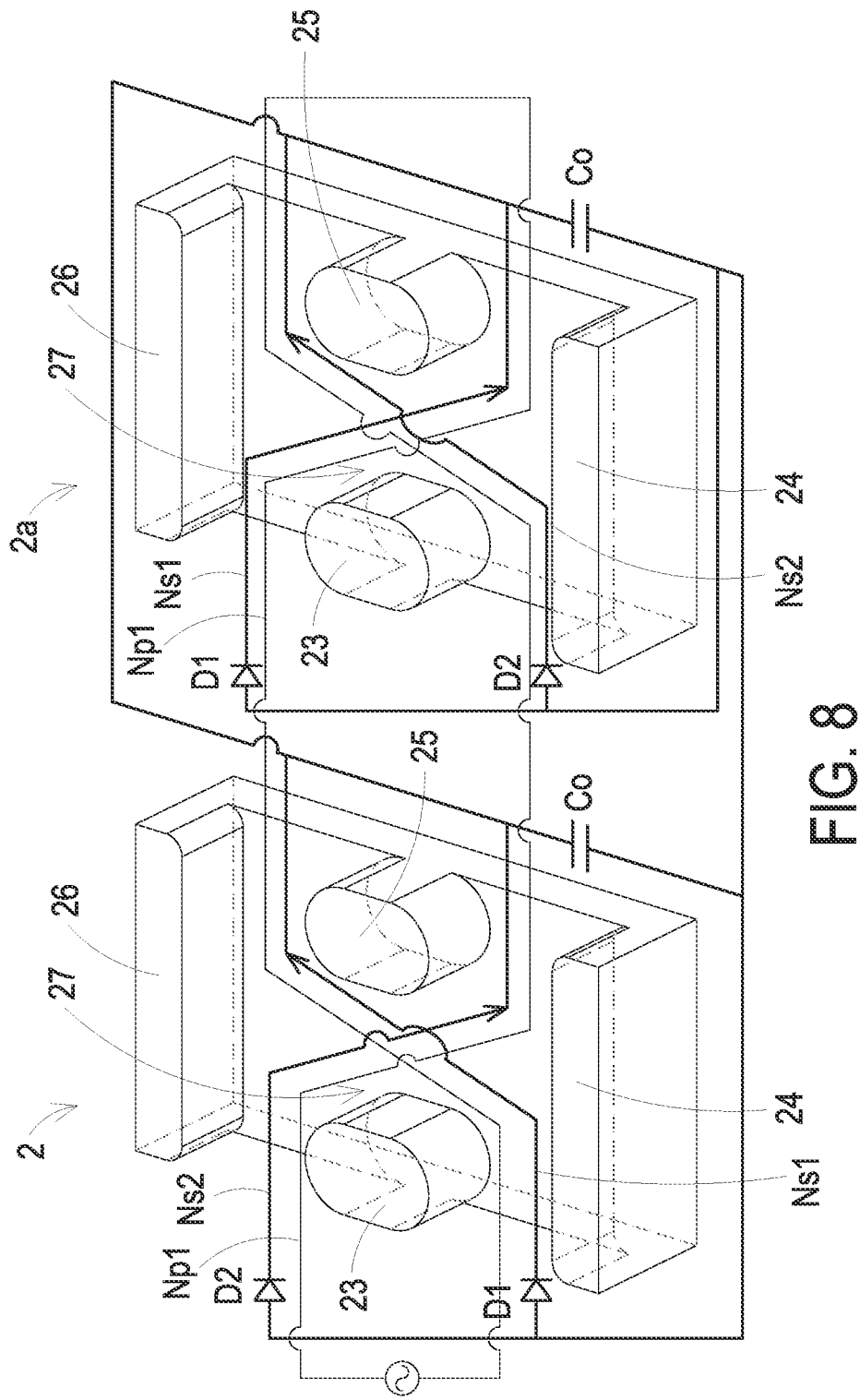
FIG. 8 schematically illustrates two magnetic devices of the power conversion module as shown in FIG. 6A, in which the first magnetic covers of the two magnetic devices are omitted.

FIG. 6A is a schematic perspective view illustrating a power conversion module according to a second embodiment of the present disclosure. FIG. 6B is a schematic perspective view illustrating the power conversion module as shown in FIG. 6A and taken along another viewpoint. FIG. 7 is a schematic circuit diagram illustrating the circuitry topology of the power conversion module as shown in FIG. 6A. FIG. 8 schematically illustrates two magnetic devices of the power conversion module as shown in FIG. 6A, in which the first magnetic covers of the two magnetic devices are omitted. As shown in FIG. 7, the circuitry topology of the power conversion module 1b of this embodiment is a single-stage conversion structure. In comparison with the power conversion module 1a of FIG. 2, the power conversion module 1b of this embodiment further includes a second magnetic device 2a and a second secondary rectifying circuit 3a. The structure of the second magnetic device 2a is similar to the structure of the first magnetic device 2. The structure of the second secondary rectifying circuit 3a is similar to the first secondary rectifying circuit 3. Component parts and elements corresponding to those of the first embodiment are designated by identical numeral references, and detailed descriptions thereof are omitted. The primary winding Np1 of the first magnetic device 2 and the primary winding Np1 of the second magnetic device 2a are serially connected between the midpoint A of the switch bridge arm and the midpoint B of the capacitor bridge arm. That is, the first terminal of the primary winding Np1 of the first magnetic device 2 is electrically connected with the midpoint A of the switch bridge arm. The second terminal of the primary winding Np1 of the first magnetic device 2 is electrically connected with the first terminal of the primary winding Np1 of the second magnetic device 2a. The second terminal of the primary winding Np1 of the second magnetic device 2a is electrically connected with the midpoint B of the capacitor bridge arm.

The electrical connection between the second secondary rectifying circuit 3a and the second magnetic device 2a is similar to the electrical connection between the first secondary rectifying circuit 3 and the first magnetic device 2, and not redundantly described herein. In the second secondary rectifying circuit 3a, the second terminal of the first secondary winding Ns1 and the second terminal of the second secondary winding Ns2 are opposed-polarity terminals. In addition, the second terminal of the first secondary winding Ns1 and the second terminal of the second secondary winding Ns2 are electrically connected with each other and collaboratively formed as a center-tap point. The center-tap point is electrically connected with the first terminal of the output capacitor Co. The first terminal of the first rectifier assembly S1 and the first terminal of the second rectifier assembly S2 of the second secondary rectifying circuit 3a are electrically connected with the second terminal of the output capacitor Co. The phase difference between the driving signal for controlling the first rectifier assembly S1 of the first secondary rectifying circuit 3 and the driving signal for controlling the first rectifier assembly S1 of the second secondary rectifying circuit 3a is 0 degree. The phase difference between the driving signal for controlling the second rectifier assembly S2 of the first secondary rectifying circuit 3 and the driving signal for controlling the second rectifier assembly S2 of the second secondary rectifying circuit 3a is 0 degree.

In this embodiment, the power conversion module 1b includes the primary switching circuit 1, two magnetic devices 2, 2a, and two secondary rectifying circuits 3, 3a. Consequently, the output current and the output power are doubled. Since only one primary switching circuit 1 is used, the overall volume of the power conversion module 1b is not largely increased. Since the primary winding Np1 of the first magnetic device 2 and the primary winding Np1 of the second magnetic device 2a are connected with each other, the turn number of the primary winding Np1 of the first magnetic device 2 and the turn number of the primary winding Np1 of the second magnetic device 2a may be halved. Since the number of electrical isolation gaps between different turns of the primary winding Np1 of each magnetic device is halved, the copper filling rate at the position of the primary winding Np1 of each magnetic device is largely increased. Consequently, the on-resistance of the primary winding Np1 of each magnetic device is reduced.

The method of winding the primary winding Np1, the first secondary winding Ns1 and the second secondary winding Ns2 of the second magnetic device 2a is similar to the method of winding the primary winding Np1, the first secondary winding Ns1 and the second secondary winding Ns2 of the first magnetic device 2. That is, the primary winding Np1 of the second magnetic device 2a is wound around the first magnetic leg 23 and the third magnetic leg 25 of the second magnetic device 2a through the connection region 27 of the second magnetic device 2a. The direction of the magnetic flux passing through the first magnetic leg 23 of the second magnetic device 2a and the direction of the magnetic flux passing through the third magnetic leg 25 of the second magnetic device 2a are opposite. The first terminal of the first secondary winding Ns1 of the second magnetic device 2a is disposed between the first magnetic leg 23 and the second magnetic leg 24. The second terminal of the first secondary winding Ns1 of the second magnetic device 2a is disposed between the third magnetic leg 25 and the fourth magnetic leg 26. The second terminal of the first secondary winding Ns1 of the second magnetic device 2a is electrically connected with the first terminal of the output capacitor Co. The first terminal of the second secondary winding Ns2 of the second magnetic device 2a is disposed between the first magnetic leg 23 and the fourth magnetic leg 26. The second terminal of the second secondary winding Ns2 of the second magnetic device 2a is disposed between the second magnetic leg 24 and the third magnetic leg 25. The second terminal of the second secondary winding Ns2 of the second magnetic device 2a is electrically connected with the first terminal of the output capacitor Co.

The primary winding Np1 of the first magnetic device 2 and the primary winding Np1 of the second magnetic device 2a are connected with each other in series. In an embodiment, the terminal voltage VAB across the primary winding Np1 of the first magnetic device 2 and the primary winding Np1 of the second magnetic device 2a (or the voltage between the midpoint A of the switch bridge arm and the midpoint B of the capacitor bridge arm) is a three-level AC voltage. That is, the terminal voltage VAB has three voltage levels, including the positive input voltage (+Vin), 0 and the negative input voltage (−Vin). In another embodiment, the terminal voltage VAB has two voltage levels, including a half of the positive input voltage (+Vin/2) and a half of the negative input voltage (−Vin/2).

The three-dimensional structure of the power conversion module 1b will be illustrated as follows. Please refer to FIGS. 6A and 6B again. In comparison with the power conversion module 1a of FIGS. 1A and 1B, the power conversion module 1b of this embodiment further includes the second magnetic device 2a, the second secondary rectifying circuit 3a and a second positive output terminal pin To2+. The second positive output terminal pins To2+, the second magnetic device 2a, the second secondary rectifying circuit 3a, the primary switch circuit 1, the first secondary rectifying circuit 3, the first magnetic device 2 and the first positive output terminal pin To2+ are sequentially arranged on the circuit board 4 along the X-axial direction. The second positive output terminal pin To2+ is used as the positive output terminal Vo+ as shown in FIG. 7. The second positive output terminal pin To2+ is made of a conductor (e.g., a copper block). In addition, the second positive output terminal pin To2+ is disposed on the first surface 40 and/or the second surface 41 of the circuit board 4.

As shown in FIG. 6A, the primary switch circuit 1 is located at a middle region of the circuit board 4. In an embodiment, each of the first rectifier assembly S1 and the second rectifier assembly S2 of the second secondary rectifying circuit 3a includes a plurality of MOSFETs connected in parallel. For example, the first rectifier assembly S1 includes a first rectifier element S11 and a second rectifier element S12, which are electrically connected with each other in parallel. The second rectifier assembly S2 includes a first rectifier element S21 and a second rectifier element S22, which are electrically connected with each other in parallel. The first rectifier element S11 of the first rectifier assembly S1 and the first rectifier element S21 of the second rectifier assembly S2 in the second secondary rectifying circuit 3a are disposed on the first surface 40 of the circuit board 4. The second rectifier element S12 of the first rectifier assembly S1 and the second rectifier element S22 of the second rectifier assembly S2 in the second secondary rectifying circuit 3a are disposed on the second surface 41 of the circuit board 4. The projection of the first rectifier element S11 in the second secondary rectifying circuit 3a on the first surface 40 and the projection of the second rectifier element S12 in the second secondary rectifying circuit 3a on the first surface 40 are overlapped with each other. The projection of the first rectifier element S21 in the second secondary rectifying circuit 3a on the first surface 40 and the projection of the second rectifier element S22 in the second secondary rectifying circuit 3a on the first surface 40 are overlapped with each other, for example mirror symmetrical to the first surface 40 and the second surface 41 of the circuit board 4.

The primary switch circuit 1 further includes a driver 10. The driver 10 is used to drive the first switch Q1 and the second switch Q2 of the switch bridge arm. The driver 10, the first switch Q1 and the second switch Q2 are sequentially arranged along the Y-axial direction of the circuit board 4, for example the driver 10 is arranged on the upper side of the first switch Q1 and the second switch Q2.

The first magnetic cover 21 and the second magnetic cover 22 of the second magnetic device 2a are locked on the circuit board 4 through the first surface 40 and the second surface 41 of the circuit board 4. The first magnetic leg 23, the second magnetic leg 24, the third magnetic leg 25 and the fourth magnetic leg 26 of the second magnetic device 2a are penetrated through corresponding perforations (not shown) of the circuit board 4 and partially accommodated within the circuit board 4. The second terminal of the first secondary winding Ns1 and the second terminal of the second secondary winding Ns2 in the second magnetic device 2a are electrically connected with the second positive output terminal pin To2+ on the second surface 41 of the circuit board 4.

The power conversion module 1b includes a plurality of input terminal pins Tin, a plurality of negative output terminal pins To− and a plurality of control and detection signal pins Ts. Some of the plurality of negative output terminal pins To− are located beside the first rectifier assembly S1 and the second rectifier assembly S2 of the second secondary rectifying circuit 3a. Some of the plurality of control and detection signal pins Ts are located beside the first capacitor C1 and the second capacitor C2 of the capacitor bridge arm. Each input terminal pin Tin is disposed between the corresponding negative output terminal pin To− and the corresponding control detection signal pin Ts.

Figure 9:
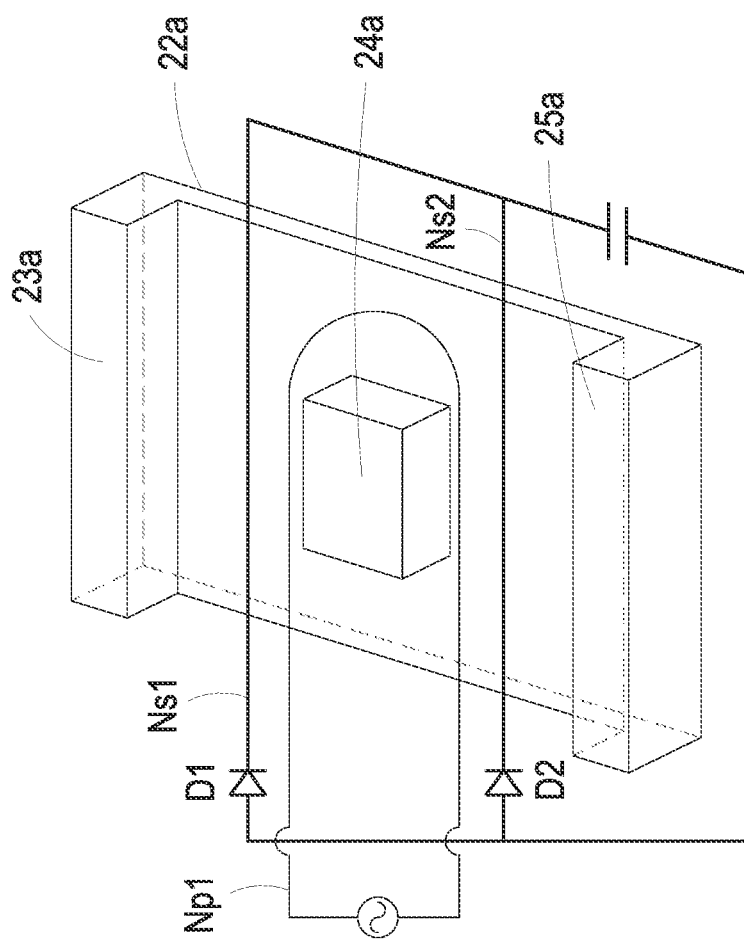
FIG. 9 schematically illustrates a variant example of a magnetic device used in the power conversion module of the present disclosure, in which the first magnetic cover is omitted.

FIG. 9 schematically illustrates a variant example of a magnetic device used in the power conversion module of the present disclosure, in which the first magnetic cover is omitted. Certainly, the structures of the first magnetic device and the second magnetic device used in the power conversion module of the present disclosure are not limited to the embodiments shown in FIG. 4 and FIG. 5. In some embodiments, the magnetic device 2b is used to replace the first magnetic device 2 as shown in FIG. 1A. Alternatively, two magnetic devices 2b are respectively used to replace the first magnetic device 2 and the second magnetic device 2a as shown in FIG. 6A. The third magnetic device 2b includes a magnetic core assembly, a primary winding Np1, a first secondary winding Ns1 and a second secondary winding Ns2. The magnetic core assembly of the third magnetic device 2b includes a first magnetic cover (not shown), a second magnetic cover 22a, a first magnetic leg 23a, a second magnetic leg 24a and a third magnetic leg 25a. The first magnetic leg 23a, the second magnetic leg 24a and the third magnetic leg 25 are disposed between the first magnetic cover and the second magnetic cover 22a. The first magnetic leg 23a and the third magnetic leg 25a are opposed to each other. In addition, the second magnetic leg 24a is disposed between the first magnetic leg 23a and the third magnetic cover 25a. In an embodiment, the first magnetic leg 23a and the third magnetic leg 25a have air gaps, and the second magnetic leg 24a has no air gaps. In another embodiment, the first magnetic leg 23a and the third magnetic leg 25a have air gaps, and the second magnetic leg 24a also have air gaps.

The primary winding Np1, the first secondary winding Ns1 and the second secondary winding Ns2 of the third magnetic device 2b are sequentially disposed in different layers of the circuit board 4 (see FIG. 1A or 6A). In addition, the primary winding Np1, the first secondary winding Ns1 and the second secondary winding Ns2 of the third magnetic device 2b are misplaced with each other along the vertical direction. The first secondary winding Ns1 is disposed between the first magnetic leg 23a and the second magnetic leg 24a. The second secondary winding Ns2 is disposed between the second magnetic leg 24a and the third magnetic leg 25a. The first terminal of the first secondary winding Ns1 is electrically connected with the second terminal of the first rectifier assembly S1 as shown in FIG. 2. The first terminal of the second secondary winding Ns2 is electrically connected with the second terminal of the second rectifier assembly S2 as shown in FIG. 2. The second terminal of the first secondary winding Ns1 and the second terminal of the second secondary winding Ns2 are connected with each other and collaboratively formed as a center-tap point. The center-tap point is electrically connected with the first terminal of the output capacitor Co. The direction of the current flowing through the first secondary winding Ns1 is limited by the first rectifier assembly S1. The direction of the current flowing through the second secondary winding Ns2 is limited by the second rectifier assembly S2. Consequently, the direction flowing through the first secondary winding Ns1 and the direction flowing through the second secondary winding Ns2 are identical. That is, the current in the first secondary winding Ns1 flows from the first terminal to the second terminal, and the current in the second secondary winding Ns2 flows from the first terminal to the second terminal. In FIG. 9, the first rectifier assembly S1 and the second rectifier assembly S2 are represented by a first diode D1 and a second diode D2, respectively.

The first terminal of the primary winding Np1 of the third magnetic device 2b is electrically with the midpoint A of the switch bridge arm as shown in FIG. 2. In addition, the first terminal of the primary winding Np1 of the third magnetic device 2b is disposed between the first magnetic leg 23a and the second magnetic leg 24a. The primary winding Np1 is wound around the second magnetic leg 24a. The second terminal of the primary winding Np1 is disposed between the second magnetic leg 24a and the third magnetic leg 25a. In addition, the second terminal of the primary winding Np1 is electrically connected with the midpoint B of the capacitor bridge arm as shown in FIG. 2.

In an embodiment, the terminal voltage VAB across the first terminal and the second terminal of the primary winding Np1 (or the voltage between the midpoint A of the switch bridge arm and the midpoint B of the capacitor bridge arm) is a three-level AC voltage. That is, the terminal voltage VAB has three voltage levels, including the positive input voltage (+Vin), 0 and the negative input voltage (−Vin). In another embodiment, the duty cycle D of each of the driving signal VQ1 and the driving signal VQ2 is close to or equal to 50%, and the terminal voltage VAB is a two-level AC voltage. That is, the terminal voltage VAB has two voltage levels, including a half of the positive input voltage (+Vin/2) and a half of the negative input voltage (−Vin/2). Moreover, the second terminal of the first secondary winding Ns1, the first terminal of the second secondary winding Ns2 and the first terminal of the primary winding Np1 are common-polarity terminals.

There is a first voltage across the first terminal and the second terminal of the first secondary winding Ns1 in the third magnetic device 2b. There is a second voltage across the first terminal and the second terminal of the second secondary winding Ns2 in the magnetic device 2b. Moreover, the phase difference between the first voltage and the second voltage is 180 degrees. The AC magnetic fluxes generated by the first secondary winding Ns1 pass through the first magnetic leg 23a. The AC magnetic fluxes generated by the second secondary winding Ns2 pass through the third magnetic leg 25a. The AC magnetic fluxes generated by the first secondary winding Ns1 and the AC magnetic fluxes generated by the second secondary winding Ns2 are cancelled out and applied to the second magnetic leg 24a. The DC magnetic fluxes generated by the DC current flowing through the first secondary winding Ns1 and the DC magnetic fluxes generated by the DC current flowing through the second secondary winding Ns2 are cancelled out on the second magnetic leg 24a. Moreover, the DC magnetic flux corresponding to the DC current flowing through the first secondary winding Ns1 and the DC magnetic flux corresponding to the DC current flowing through the second secondary winding Ns2 are superposed and applied to the first magnetic leg 23a and the third magnetic leg 25a. The air gaps of the first magnetic leg 23a and the third magnetic leg 25a can avoid the saturation of the first magnetic leg 23a and the third magnetic leg 25a.

In comparison with the first magnetic device 2 of FIG. 5, the air gap and the magnetic resistance of the first magnetic leg 23a of the magnetic device 2b are larger. Since the AC magnetic flux passing through the first magnetic leg 23a is larger, the ripple of the AC current of the first secondary winding Ns1 is higher, and the equivalent inductance of the first secondary winding Ns1 is lower. Similarly, the AC magnetic flux of the third magnetic leg 25a is larger, and the air gap and the magnetic resistance of the third magnetic leg 25a are larger. When compared with the first magnetic leg 23a, the air gap and the magnetic resistance of the third magnetic leg 25a are larger. Since the AC magnetic flux passing through the third magnetic leg 25a is larger, the ripple of the AC current of the first secondary winding Ns1 is higher, and the equivalent inductance of the first secondary winding Ns1 is lower. Since the primary winding Np1 is magnetically coupled with the first secondary winding Ns1 and the second secondary winding Ns2, the ripple of the AC current of the primary winding Np1 is increased. Since the first secondary winding Ns1 and the second secondary winding Ns2 are linearly transferred through the regions between corresponding magnetic legs, the paths of the first secondary winding Ns1 and the second secondary winding Ns2 are short. Since the equivalent parasitic resistance is small and the on-resistance is low, the third magnetic device 2b is suitably applied to the large-current circumstance.

In an embodiment, the whole magnetic core assembly is made of the same material (e.g., ferrite or iron powder). In another embodiment, the material of the magnetic core assembly is specially determined. Preferably, the material of the first magnetic leg 23a and the third magnetic leg 25a is different from the material of the rest of the magnetic core assembly. For example, the first magnetic leg 23a and the third magnetic leg 25a are made of ferrite, and the rest of the magnetic core assembly is made of iron powder with distributed-air-gap. Consequently, the core loss of the magnetic core assembly 20 is low, and the equivalent inductance of the first secondary winding Ns1 and the second secondary winding Ns2 of the magnetic core assembly is high.

Figure 10A:
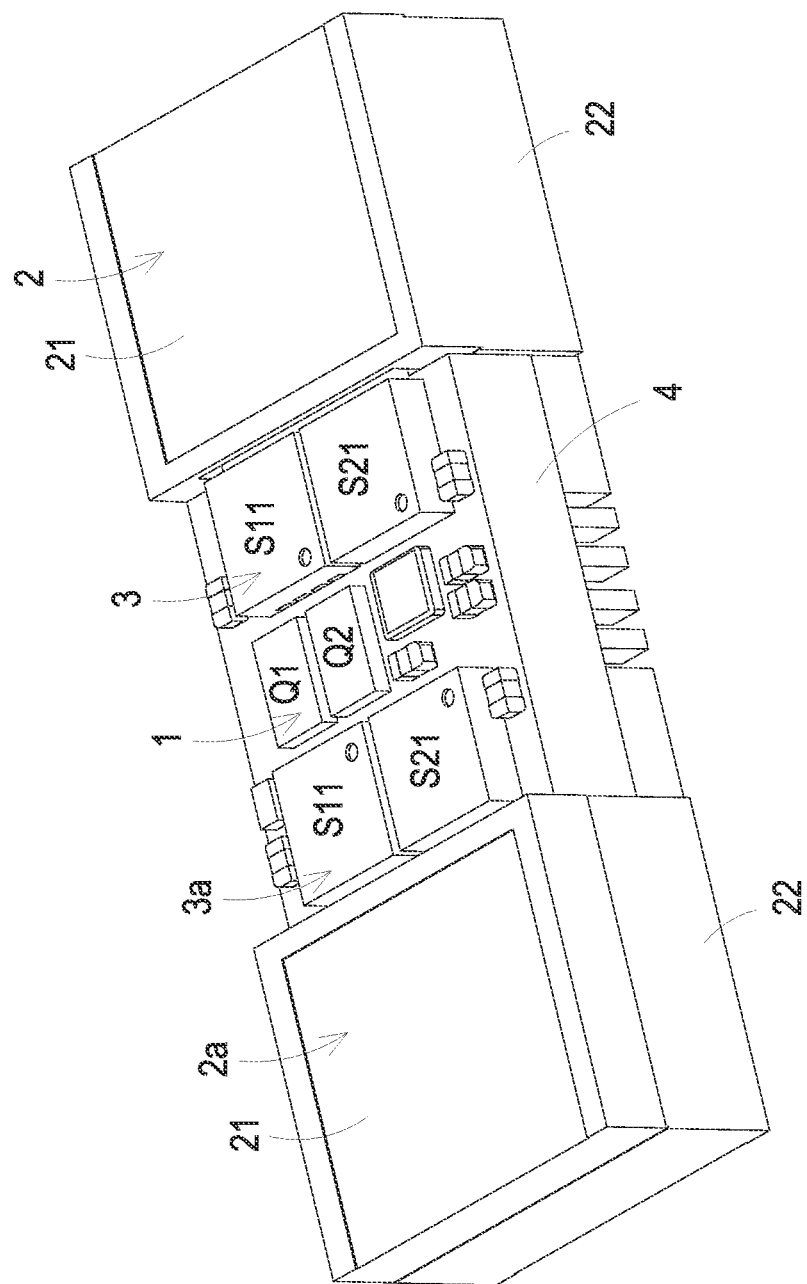
FIG. 10A is a schematic perspective view illustrating a power conversion module according to a third embodiment of the present disclosure.
Figure 10B:
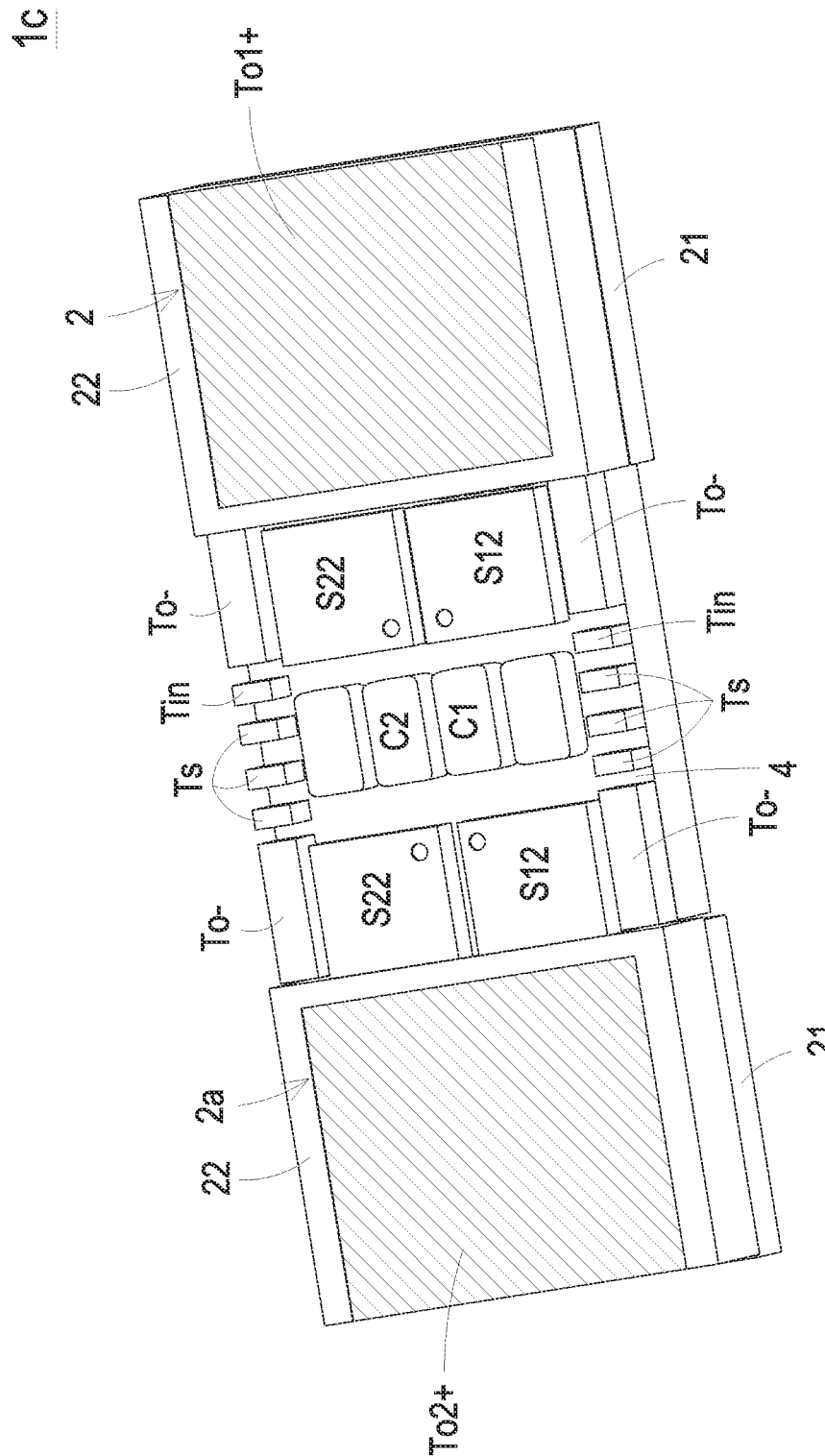
FIG. 10B is a schematic perspective view illustrating the power conversion module as shown in FIG. 10A and taken along another viewpoint.
Figure 11:
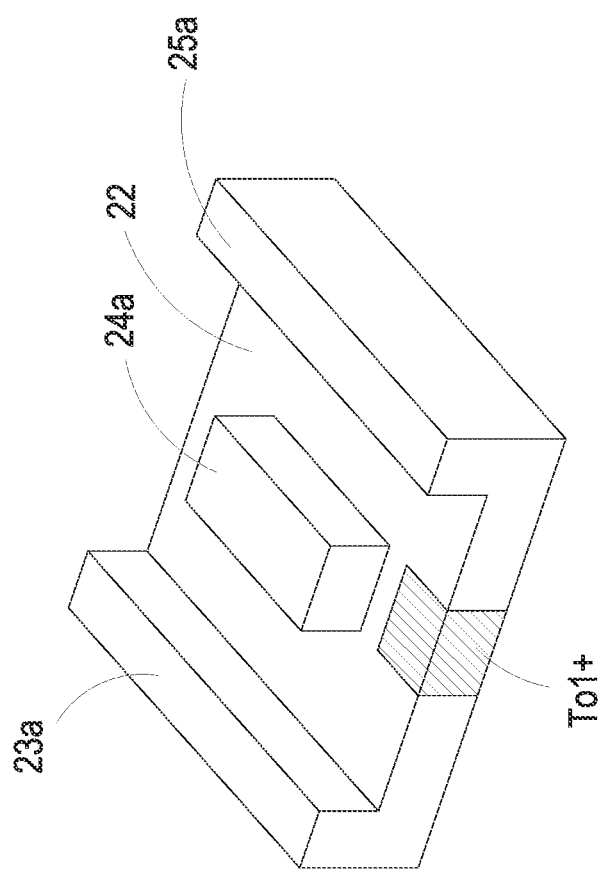
FIG. 11 schematically illustrates a variant example of the first magnetic device as shown in FIG. 10A, in which the first magnetic cover is omitted.

FIG. 10A is a schematic perspective view illustrating a power conversion module according to a third embodiment of the present disclosure. FIG. 10B is a schematic perspective view illustrating the power conversion module as shown in FIG. 10A and taken along another viewpoint. FIG. 10C is a schematic exploded view illustrating the power conversion module as shown in FIG. 10A. FIG. 11 schematically illustrates a variant example of the first magnetic device as shown in FIG. 10A, in which the first magnetic cover is omitted. In comparison with the power conversion module 1b, two magnetic devices 2b as shown in FIG. 9 are used in the power conversion module 1c of this embodiment to replace the first magnetic device 2 and the second magnetic device 2a as shown in FIG. 6A. Moreover, the first positive output terminal pin To1+ of the power conversion module 1c is disposed on at least one surface of the second magnetic cover 22 of the first magnetic device 2. For example, the first positive output terminal pin To1+ is disposed on the top surface of the second magnetic cover 22, the bottom surface of the second magnetic cover 22, and a lateral surface between the top surface and the bottom surface of the second magnetic cover 22. The second positive output terminal pin To2+ is disposed on at least one surface of the second magnetic cover 22 of the second magnetic device 2a. For example, the second positive output terminal pin To2+ is disposed on the top surface of the second magnetic cover 22, the bottom surface of the second magnetic cover 22, and a lateral surface between the top surface and the bottom surface of the second magnetic cover 22. Since the first positive output terminal pin To1+ is disposed on at least one surface of the second magnetic cover 22 of the first magnetic device 2 and the second positive output terminal pin To2+ is disposed on at least one surface of the second magnetic cover 22 of the second magnetic device 2a, the size of circuit board 4 of the power conversion module 1c is reduced. Due to this structural design, the size of the power conversion module 1c is reduced, and the power density of the power conversion module 1c is increased.

In an embodiment, the first positive output terminal pin To1+ is electroplated on the top surface, the bottom surface and the lateral surface of the second magnetic cover 22 of the first magnetic device 2, and the second positive output terminal pin To2+ is electroplated on the top surface, the bottom surface and the lateral surface of the second magnetic cover 22 of the second magnetic device 2b. Consequently, the capability of the positive output terminal Vo+ to conduct electricity is enhanced. The first positive output terminal pin To1+ is embedded in at least one surface of the second magnetic cover 22 of the first magnetic device 2, and the second positive output terminal pin To2+ is embedded in at least one surface of the second magnetic cover 22 of the second magnetic device 2b.

It is noted that the positions of the first positive output terminal pin To1+ and the second positive output terminal pin To2+ may be varied according to the practical requirements. FIG. 11 schematically illustrates a variant example of the first magnetic device as shown in FIG. 10A, in which the first magnetic cover is omitted. The first positive output terminal pin To1+ is electroplated on a middle region of a lateral surface of the second magnetic cover 22 of the first magnetic device 2 and the top surface and the bottom surface of the second magnetic cover 22 adjacent to the lateral surface. Similarly, the second positive output terminal pin To2+ is electroplated on a middle region of a lateral surface of the second magnetic cover 22 of the second magnetic device 2b and the top surface and the bottom surface of the second magnetic cover 22 adjacent to the lateral surface.

Figure 12:
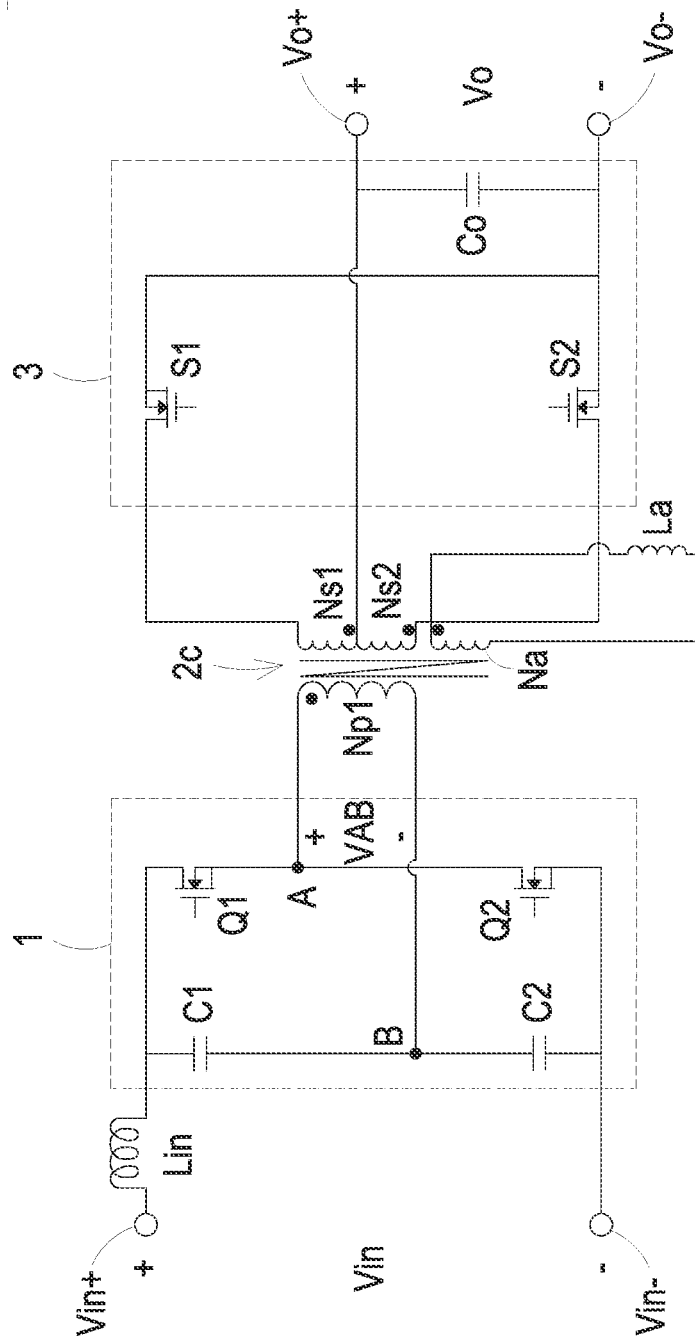
FIG. 12 is a schematic circuit diagram illustrating the circuitry topology of a power conversion module according to a fourth embodiment of the present disclosure.
Figure 13:
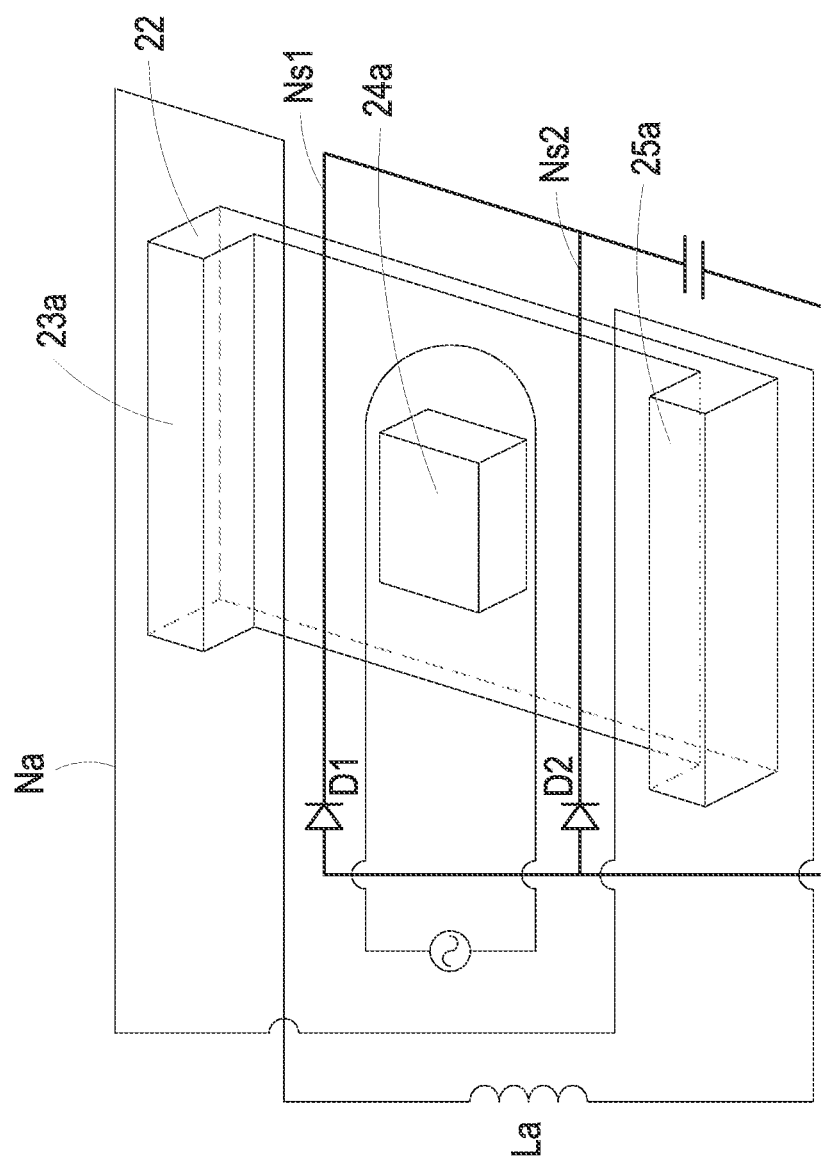
FIG. 13 schematically illustrates the magnetic device of the power conversion module as shown in FIG. 12, in which the first magnetic cover is omitted.

FIG. 12 is a schematic circuit diagram illustrating the circuitry topology of a power conversion module according to a fourth embodiment of the present disclosure. FIG. 13 schematically illustrates the magnetic device of the power conversion module as shown in FIG. 12, in which the first magnetic cover is omitted. In comparison with the power conversion module 1a of FIG. 2, the power conversion module 1d of this embodiment further includes an auxiliary winding Na. In addition, the structure of the magnetic device 2c in the power conversion module 1d of this embodiment is similar to that of the magnetic device 2b of FIG. 9. Component parts and elements corresponding to those of the above embodiments are designated by identical numeral references, and detailed descriptions thereof are omitted. The magnetic device 2c further includes the auxiliary winding Na. The auxiliary winding Na and the primary winding Np1 are magnetically coupled with each other. The auxiliary winding Na is further electrically connected with an external auxiliary inductor La. Moreover, the auxiliary winding Na is wound around the first magnetic leg 23a and the third magnetic leg 25 in an 8-shaped form. Moreover, a first AC voltage is coupled by the auxiliary winding Na and applied to the first magnetic leg 23a, and a second AC voltage is coupled by the auxiliary winding Na and applied to the second magnetic leg 24a. The amplitude of the first AC voltage and the amplitude of the second AC voltage are equal. Moreover, the phase difference between the first AC voltage and the second AC voltage is 180 degrees.

As mentioned above, the auxiliary winding Na is wound around the first magnetic leg 23a and the third magnetic leg 25a in the 8-shaped form. Consequently, the amplitude of the voltage of the auxiliary winding Na is decreased, and the frequency is doubled. It is assumed that the duty cycle of each of the first AC voltage and the duty cycle of the second AC voltage is close to 50%. After the auxiliary winding Na is wound around the first magnetic leg 23a and the third magnetic leg 25a in The 8-shaped form, the duty cycle of the AC voltage on the auxiliary winding Na is close to 100%. The AC voltage is applied to the auxiliary inductor La. Consequently, the ripple current of the auxiliary inductor La is low.

When the load driven by the power conversion module 1d is subjected to the dynamic conversion and switched from the heavy load condition to the light load condition, the output voltage Vo from the power conversion module 1d possibly overshoots. For solving the overshoot problem, the response of the controller (not shown) of the power conversion module 1d allows the duty cycles of the driving signals of the switch bridge arm (i.e., the driving signals for controlling the first switch Q1 and the second switch Q2) to be zero. In addition, the first rectifier assembly S1 and the second rectifier assembly S2 of the first secondary rectifying circuit 3 are continuously turned on. Consequently, both of the first secondary winding Ns1 and the second secondary winding Ns2 withstand the output voltage Vo. Due to the arrangement of the auxiliary winding Na, the first AC voltage (i.e., the AC voltage coupled by the auxiliary winding Na and applied to the first magnetic leg 23a) and the second AC voltage (i.e., the AC voltage coupled by the auxiliary winding Na and applied to the second magnetic leg 24a) are in direct proportion to the output voltage Vo. Consequently, the first AC voltage and the second AC voltage are superposed and applied on the auxiliary inductor La. Consequently, the magnitude of the current flowing through the auxiliary inductor La is largely increased, and the magnitude of the current flowing through the first secondary winding Ns1 and the magnitude of the current flowing through the second secondary winding Ns2 are largely decreased. Consequently, the overshoot of the output voltage Vo is largely suppressed.

The technology of using the auxiliary winding Na to suppress the dynamic overshoot can be applied to the power conversion module with a plurality of basic power units connected in parallel.

Figure 14:
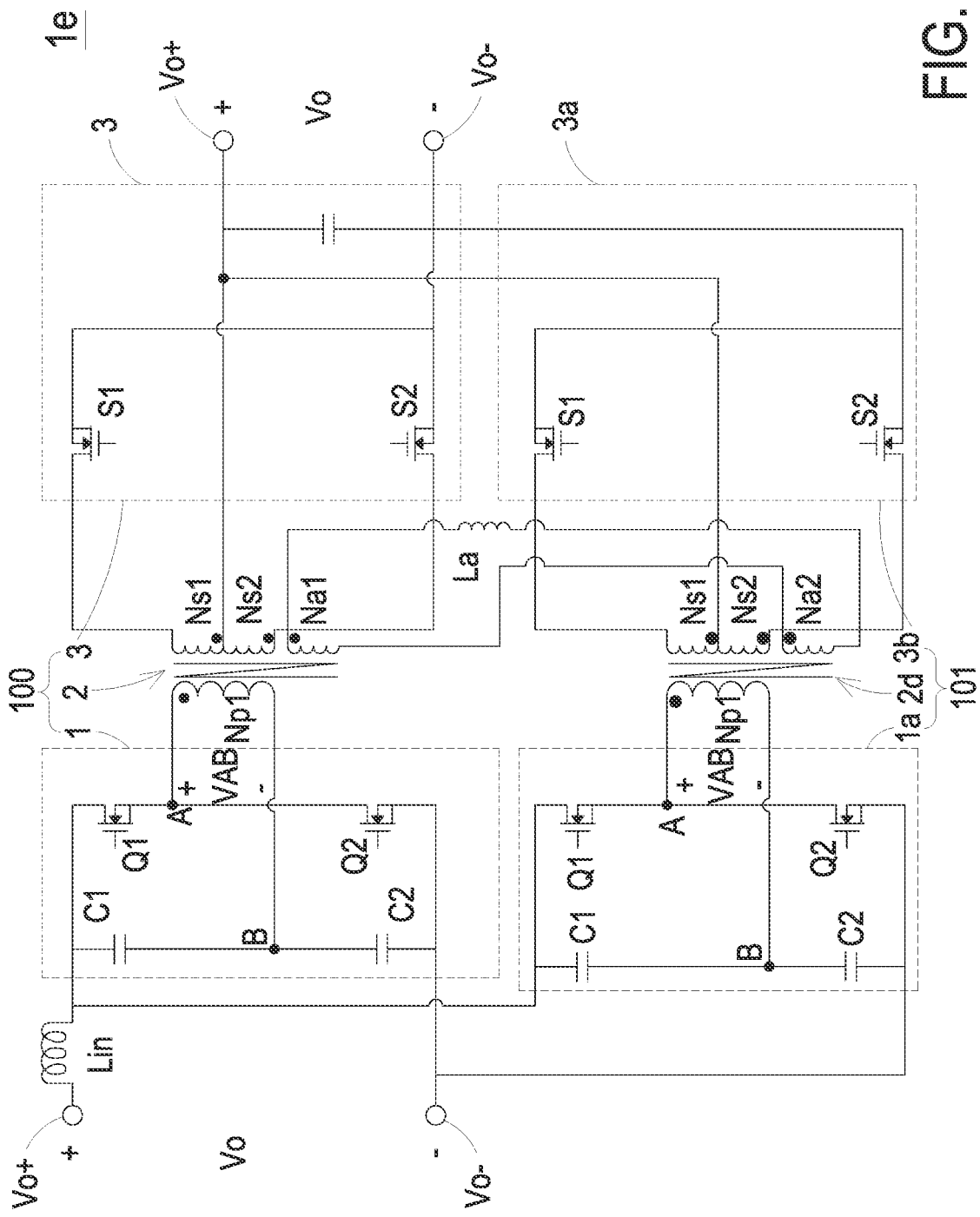
FIG. 14 is a schematic circuit diagram illustrating the circuitry topology of a power conversion module according to a fifth embodiment of the present disclosure.
Figure 15:
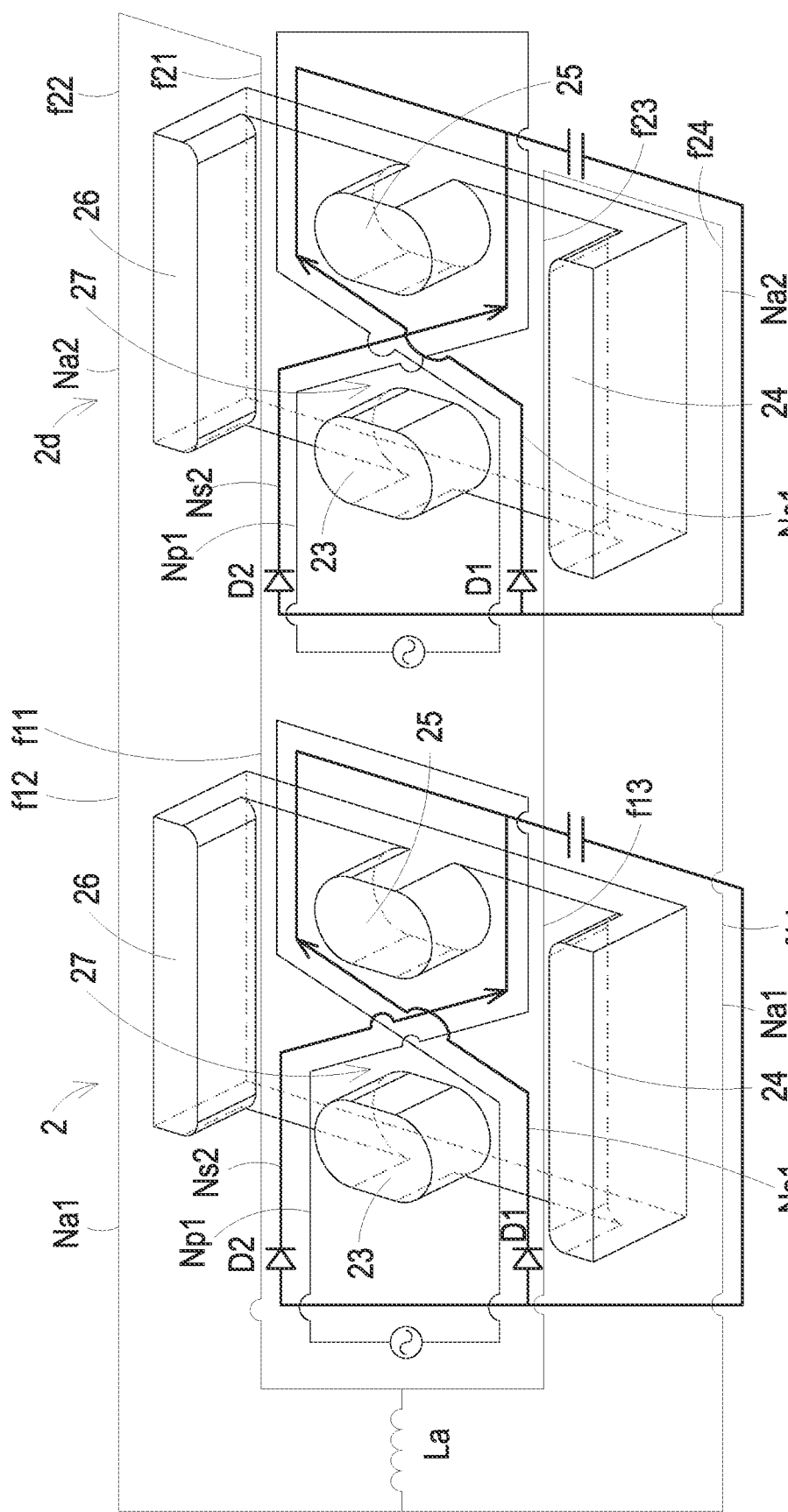
FIG. 15 schematically illustrates the two magnetic devices of the power conversion module as shown in FIG. 14, in which the first magnetic cover is omitted.

FIG. 14 is a schematic circuit diagram illustrating the circuitry topology of a power conversion module according to a fifth embodiment of the present disclosure. FIG. 15 schematically illustrates the two magnetic devices of the power conversion module as shown in FIG. 14, in which the first magnetic cover is omitted. In this embodiment, the circuitry topology of the power conversion module 1e is a single-stage conversion structure. When compared with the power conversion module 1a as shown in FIG. 2, the power conversion module 1e of this embodiment includes two basic power units. The two basic power units includes a first basic power unit 100 and a second basic power unit 101. The output terminal of the first basic power unit 100 and the output terminal of the second basic power unit 101 are electrically connected with each other. The input terminal of the first basic power unit 100 and the input terminal of the second basic power unit 101 are electrically connected with each other. The first basic power unit 100 includes a primary switch circuit 1, a first magnetic device 2 and a first secondary rectifying circuit 3. The circuitry topologies and the operations of the primary switch circuit 1, the first magnetic device 2 and the first secondary rectifying circuit 3 in this embodiment are similar to those as shown in FIG. 2, and not redundantly described herein. The second basic power unit 101 includes a primary switch circuit 1a, a first magnetic device 2d and a first secondary rectifying circuit 3b. The circuitry topologies and the operations of the primary switch circuit 1a, the first magnetic device 2d and the first secondary rectifying circuit 3b of the second basic power unit 101 in this embodiment are similar to those of the first basic power unit 100, and not redundantly described herein. Moreover, the positive output terminal pin To1+ of the second basic power unit 101, the first magnetic device 2d, the first secondary rectifying circuit 3b, the primary switch circuit 1a, the primary switch circuit 1, the first secondary rectifying circuit 3, the first magnetic device 2 and the positive output terminal pin To1+ of the first basic power unit 100 are sequentially arranged on the circuit board 4 along a specified direction (not shown).

The first basic power unit 100 further includes an auxiliary winding Na1. The second basic power unit 101 further includes an auxiliary winding Na2. As shown in FIG. 15, the auxiliary winding Na1 and the auxiliary winding Na2 are wound around the second magnetic leg 24 and the fourth magnetic leg 26 of the first magnetic device 2 and the second magnetic leg 24 and the fourth magnetic leg 26 of the first magnetic device 2d. For example, the auxiliary winding Na1 includes a first segment f11, a second segment f12, a third segment f13 and a fourth segment f14, and the auxiliary winding Na2 includes a first segment f21, a second segment f22, a third segment f23 and a fourth segment f24.

The first segment f11 of the auxiliary winding Na1 is transported through the region between the first magnetic leg 23 and the fourth magnetic leg 26 of the first magnetic device 2 and the region between the third magnetic leg 25 and the fourth magnetic leg 26 of the first magnetic device 2. The first segment f21 of the auxiliary winding Na2 is transported through the region between the first magnetic leg 23 and the fourth magnetic leg 26 of the first magnetic device 2d and the region between the third magnetic leg 25 and the fourth magnetic leg 26 of the first magnetic device 2d. The second segment f22 of the auxiliary winding Na2 is transported through the outer side of the fourth magnetic leg 26 of the first magnetic device 2d. The second segment f12 of the auxiliary winding Na1 is transported through the outer side of the fourth magnetic leg 26 of the first magnetic device 2. The first segment f11 of the auxiliary winding Na1, the first segment f21 of the auxiliary winding Na2, the second segment f22 of the auxiliary winding Na2 and the second segment f12 of the auxiliary winding Na1 are sequentially connected with each other and wound around the fourth magnetic leg 26 of the first magnetic device 2 and the fourth magnetic leg 26 of the first magnetic device 2d. Consequently, a first serial branch is defined.

The third segment f13 of the auxiliary winding Na1 is transported through the region between the first magnetic leg 23 and the second magnetic leg 24 of the first magnetic device 2 and the region between the third magnetic leg 25 and the second magnetic leg 24 of the first magnetic device 2. The third segment f23 of the auxiliary winding Na2 is transported through the region between the first magnetic leg 23 and the second magnetic leg 24 of the first magnetic device 2d and the region between the third magnetic leg 25 and the second magnetic leg 24 of the first magnetic device 2d. The fourth segment f24 of the auxiliary winding Na2 is transported through the outer side of the second magnetic leg 24 of the first magnetic device 2d. The fourth segment f14 of the auxiliary winding Na1 is transported through the outer side of the second magnetic leg 24 of the first magnetic device 2. The third segment f13 of the auxiliary winding Na1, the third segment f23 of the auxiliary winding Na2, the fourth segment f24 of the auxiliary winding Na2 and the fourth segment f14 of the auxiliary winding Na1 are sequentially connected with each other and wound around the second magnetic leg 24 of the first magnetic device 2 and the second magnetic leg 24 of the first magnetic device 2d. Consequently, a second serial branch is defined.

Please refer to FIG. 15 again. The power conversion module further includes an auxiliary inductor La. The first segment f11 of the auxiliary winding Na1 and the third segment f13 of the auxiliary winding Na1 are connected with a first terminal of the auxiliary inductor La. The second segment f12 of the auxiliary winding Na1, the fourth segment f14 of the auxiliary winding Na1 are connected with a second terminal of the auxiliary inductor La. That is, the first serial branch, the second serial branch and the auxiliary inductor La are connected with each other in parallel. Similarly, the AC voltage coupled by the auxiliary winding Na1 and the auxiliary winding Na2 is applied to the auxiliary inductor La. Consequently, the ripple current of the auxiliary inductor La is low.

Figure 16:
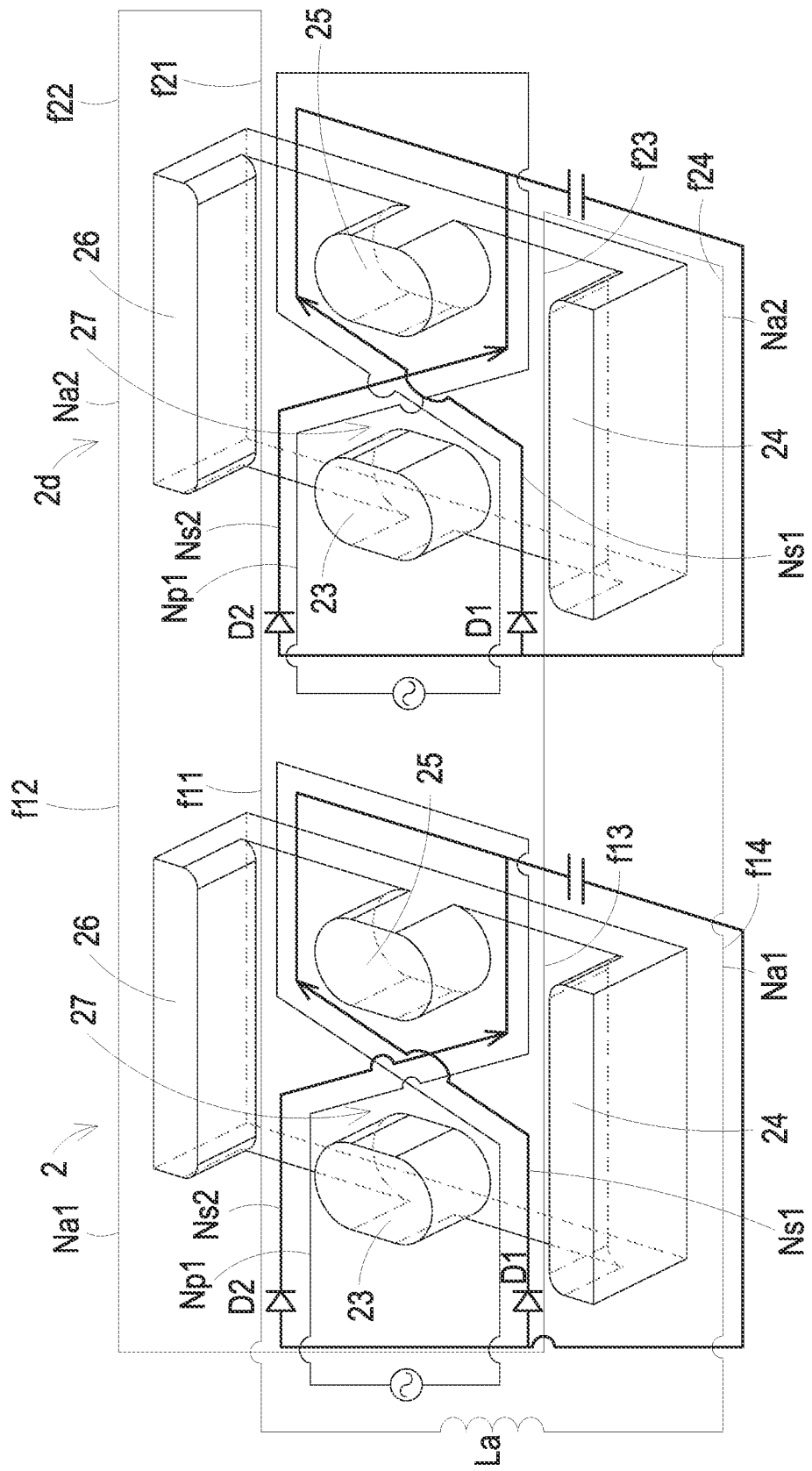
FIG. 16 schematically illustrates a variant example of the winding structure of the two auxiliary windings as shown in FIG. 15.

FIG. 16 schematically illustrates a variant example of the winding structure of the two auxiliary windings as shown in FIG. 15. Like the embodiment of FIG. 15, the power conversion module of this embodiment also includes a first serial branch and a second serial branch. The first segment f11 of the auxiliary winding Na1, the first segment f21 of the auxiliary winding Na2, the second segment f22 of the auxiliary winding Na2 and the second segment f12 of the auxiliary winding Na1 are sequentially connected with each other and wound around the fourth magnetic leg 26 of the first magnetic device 2 and the fourth magnetic leg 26 of the first magnetic device 2d. Consequently, the first serial branch is defined. The third segment f13 of the auxiliary winding Na1, the third segment f23 of the auxiliary winding Na2, the fourth segment f24 of the auxiliary winding Na2 and the fourth segment f14 of the auxiliary winding Na1 are sequentially connected with each other and wound around the second magnetic leg 24 of the first magnetic device 2 and the second magnetic leg 24 of the first magnetic device 2d. Consequently, the second serial branch is defined.

The power conversion module further includes an auxiliary inductor La. In comparison with the embodiment of FIG. 15, the first serial branch, the second serial branch and the auxiliary inductor La in the power conversion module of this embodiment are connected with each other in series and collaboratively formed as an electrically closed loop. That is, the first segment f11 of the auxiliary winding Na1 is connected with a first terminal of the auxiliary inductor La, the second segment f12 of the auxiliary winding Na1 is connected with the third segment f13 of the auxiliary winding Na1, and the fourth segment f14 of the auxiliary winding Na1 is connected with a second terminal of the auxiliary inductor La. In other words, the auxiliary winding Na1 and the auxiliary winding Na2 are wound around the second magnetic leg 24 and the fourth magnetic leg 26 of the first magnetic device 2 and the second magnetic leg 24 and the fourth magnetic leg 26 of the first magnetic device 2d in an 8-shaped form. Similarly, the AC voltage coupled by the auxiliary winding Na1 and the auxiliary winding Na2 is applied to the auxiliary inductor La. Consequently, the ripple current of the auxiliary inductor La is low. In comparison with the embodiment of FIG. 15, the voltage across the two terminals of the auxiliary winding Na1 and the voltage across the auxiliary winding Na2 in this embodiment are superposed. Consequently, the voltage across the two terminals of the auxiliary inductor La is doubled, and current flowing through the auxiliary inductor La is halved. Moreover, the equivalent parasitic resistance and the on-resistance are reduced.

When the winding method of FIG. 15 or 16 is applied to a single basic power unit, the use of a single auxiliary winding can achieve the purpose of suppressing the dynamic overshoot.

In an embodiment, the phase difference between the driving signal for controlling the switch bridge arm of the first basic power unit 100 and the driving signal for controlling the switch bridge arm of the second basic power unit 101 is 90 degrees. That is, the phase difference between the terminal voltage VAB of the first basic power unit 100 and the terminal voltage VAB of the second basic power unit 101 is 90 degrees.

In the above embodiment, each of the first magnetic device 2 and the first magnetic device 2d of the power conversion module 1e have the structure of the first magnetic device 2 as shown in FIG. 5. The auxiliary winding Na1 of the first basic power unit 100 is magnetically coupled on the second magnetic leg 24 and the fourth magnetic leg 26 of the first magnetic device 2. Consequently, the frequency of the voltage of the auxiliary winding Na1 is quadrupled. Similarly, the auxiliary winding Na2 of the second basic power unit 101 is magnetically coupled on the second magnetic leg 24 and the fourth magnetic leg 26 of the first magnetic device 2d. Consequently, the frequency of the voltage of the auxiliary winding Na2 is quadrupled. In case that the duty cycle of the driving signal for controlling the switch bridge arm of the primary switch circuit 1 is 25%, the duty cycle of the AC voltage on the auxiliary winding Na1 is close to 100%. In case that the duty cycle of the driving signal for controlling the switch bridge arm of the primary switch circuit 1a is 25%, the duty cycle of the AC voltage on the auxiliary winding Na2 is close to 100%. The AC voltage of the auxiliary winding Na1 and the AC voltage of the auxiliary winding Na2 are applied to the auxiliary inductor La. Consequently, the ripple current of the auxiliary inductor La is low.

When the load driven by the power conversion module 1e is subjected to the dynamic conversion and switched from the heavy load condition to the light load condition, the output voltage from the power conversion module 1e possibly overshoots. For solving the overshoot problem, the response of the controller (not shown) of the power conversion module 1e allows the duty cycles of the driving signals of the switch bridge arm (i.e., the driving signals for controlling the first switch Q1 and the second switch Q2) to be zero. Since the first rectifier assembly S1 and the second rectifier assembly S2 of the first secondary rectifying circuit 3 are continuously turned on, both of the first secondary winding Ns1 and the second secondary winding Ns2 in the first basic power unit 100 withstand the output voltage Vo. Similarly, since the first rectifier assembly S1 and the second rectifier assembly S2 of the first secondary rectifying circuit 3b are continuously turned on, both of the first secondary winding Ns1 and the second secondary winding Ns2 in the second basic power unit 101 withstand the output voltage Vo. Due to the arrangement of the auxiliary windings Na1 and Na2, the magnitude of the voltage coupled by the auxiliary windings Na1 and Na2 is equal to four times the output voltage Vo and applied on the auxiliary inductor La. Consequently, the magnitude of the current flowing through the auxiliary inductor La is largely increased, and the magnitude of the current flowing through the first secondary winding Ns1 and the magnitude of the current flowing through the second secondary winding Ns2 are largely decreased. Consequently, the overshoot of the output voltage Vo is largely suppressed.

From the above descriptions, the present disclosure provides the power conversion module and the magnetic device. In the magnetic device, the magnetic resistance of each of the second magnetic leg and the fourth magnetic leg is greater than the magnetic resistance of each of the first magnetic leg and the third magnetic leg. The projection of the primary winding, the projection of the first secondary winding and the projection of the second secondary winding are partially overlapped with each other in the connection region. Consequently, the ripple of the AC current flowing through the primary winding, the first secondary winding and the second secondary winding is reduced, and the capability of withstanding magnetic saturation is enhanced. The primary switch circuit, the first secondary rectifying circuit, the first magnetic device and the first positive output terminal pin are sequentially arranged along the X-axial direction of the circuit board. Consequently, the width of the power conversion module along the Y-axial direction of the circuit board is reduced. Moreover, the output current or the output power of the power conversion module can be expanded. The power conversion module has small size and high power density. Consequently, the power conversion module is suitably applied to a long-sized and high-density electronic device (e.g., a display card or an ASIC card).

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion module, comprising:
    a circuit board; and
    a first basic power unit disposed on the circuit board, and comprising:
        a magnetic device;
        a primary switch circuit;
        a first secondary rectifying circuit; and
        a first positive output terminal pin,
    wherein the primary switch circuit, the first secondary rectifying circuit, the magnetic device and the first positive output terminal pin are sequentially arranged on the circuit board along a first direction.

2. The power conversion module according to claim 1, wherein the magnetic device comprises:
    a magnetic core assembly comprising a first magnetic cover, a second magnetic cover and at least one magnetic leg, the at least one magnetic leg is disposed between the first magnetic cover and the second magnetic cover, and the first magnetic cover and the second magnetic cover are respectively disposed on a first surface and a second surface of the circuit board, wherein the first surface and the second surface are opposed to each other;
    a primary winding and at least one secondary winding wound around the at least one magnetic leg and having a first terminal and a second terminal, respectively, wherein the first terminal and the second terminal of the primary winding are adjacent to the first secondary rectifying circuit, the first terminal of the at least one secondary winding is adjacent to the first secondary rectifying circuit, and the second terminal of the at least one secondary winding is adjacent to the first positive output terminal pin.

3. The power conversion module according to claim 2, wherein the magnetic core assembly comprises:
    the first magnetic cover and the second magnetic cover; and
    the at least one magnetic leg comprising a first magnetic leg, a second magnetic leg, a third magnetic leg and a fourth magnetic leg, wherein the first magnetic leg and the third magnetic leg are opposed to each other, the first magnetic leg and the third magnetic leg are disposed between the first magnetic cover and the second magnetic cover, the second magnetic leg and the fourth magnetic leg are opposed to each other, the second magnetic leg and the fourth magnetic leg are disposed between the first magnetic cover and the second magnetic cover, and the first magnetic leg and the third magnetic leg are disposed between the second magnetic leg and the fourth magnetic leg, wherein a magnetic resistance of each of the second magnetic leg and the fourth magnetic leg is greater than a magnetic resistance of each of the first magnetic leg and the third magnetic leg, and a connection region is defined by a region formed by the first magnetic leg, the second magnetic leg, the third magnetic leg and the fourth magnetic leg;
    wherein the primary winding wound around the first magnetic leg and the third magnetic leg through the connection region, wherein a direction of a magnetic flux passing through the first magnetic leg and a direction of a magnetic flux passing through the third magnetic leg are opposite;
    wherein the at least one secondary winding comprises a first secondary winding and a second secondary winding, wherein a first terminal of the first secondary winding is disposed between the first magnetic leg and the second magnetic leg, and a second terminal of the first secondary winding is disposed between the third magnetic leg and the fourth magnetic leg, wherein a first terminal of the second secondary winding is disposed between the first magnetic leg and the fourth magnetic leg, and a second terminal of the second secondary winding is disposed between the second magnetic leg and the third magnetic leg, wherein a portion of the first secondary winding and a portion of the second secondary winding are accommodated within the connection region.

4. The power conversion module according to claim 2, wherein the magnetic core assembly comprises:
    the at least one magnetic leg comprising a first magnetic leg, a second magnetic leg and a third magnetic leg, wherein the first magnetic leg, the second magnetic leg and the third magnetic leg are disposed between the first magnetic cover and the second magnetic cover, the second magnetic leg is disposed between the first magnetic leg and the third magnetic leg, wherein a magnetic resistance of each of the first magnetic leg and the third magnetic leg is greater than a magnetic resistance of the second magnetic leg;
    wherein the primary winding wound around the second magnetic leg;
    wherein the at least one secondary winding comprises a first secondary winding and a second secondary winding, wherein a first terminal of the first secondary winding is disposed between the first magnetic leg and the second magnetic leg, and a second terminal of the first secondary winding is disposed between the first magnetic leg and the second magnetic leg, wherein a first terminal of the second secondary winding is disposed between the second magnetic leg and the third magnetic leg, and a second terminal of the second secondary winding is disposed between the second magnetic leg and the third magnetic leg.

5. The power conversion module according to claim 2, wherein the primary switch circuit comprises a switch bridge arm, and the switch bridge arm comprises two switches, which are electrically connected with each other in series, wherein a midpoint of the switch bridge arm is electrically connected with the first terminal of the primary winding of the magnetic device, and the two switches are disposed on the first surface of the circuit board.

6. The power conversion module according to claim 5, wherein the primary switching circuit further comprises a capacitor bridge arm, and the capacitor bridge arm and the switch bridge arm are connected with each other in parallel, wherein the capacitor bridge arm comprises two capacitors, which are connected with each other in series, wherein a midpoint of the capacitor bridge arm is electrically connected with the second terminal of the primary winding of the magnetic device, and the two capacitors are disposed on the second surface of the circuit board.

7. The power conversion module according to claim 5, wherein the primary switch circuit further comprises an additional switch bridge arm, and the additional switch bridge arm and the switch bridge arm are connected with each other in parallel, wherein the additional switch bridge arm comprises two in series connected switches, wherein a midpoint of the additional switch bridge arm is electrically connected with the second terminal of the primary winding of the magnetic device.

8. The power conversion module according to claim 2, wherein the power conversion module further comprises a plurality of input terminal pins, a plurality of negative output terminal pins and a plurality of control and detection signal pins, wherein the plurality of input terminal pins, the plurality of negative output terminal pins and the plurality of control and detection signal pins are disposed on two opposite lateral regions of the second surface of the circuit board along a second direction, wherein the first direction and the second direction are perpendicular to each other.

9. The power conversion module according to claim 1, wherein the power conversion module further comprises an additional magnetic device, a second secondary rectifying circuit and a second positive output terminal pin, wherein the second positive output terminal pin, the additional magnetic device, the second secondary rectifying circuit, the primary switch circuit, the first secondary rectifying circuit, the magnetic device and the first positive output terminal pin are sequentially arranged on the circuit board along the first direction.

10. The power conversion module according to claim 9, wherein a structure of the magnetic device and a structure of the additional magnetic device are identical, and the primary winding of the magnetic device and the primary winding of the additional magnetic device are connected with each other in series.

11. The power conversion module according to claim 1, wherein the power conversion module further comprises a second basic power unit, and a structure of the first basic power unit and a structure of the second basic power unit are identical, wherein the first positive output terminal pin of the second basic power unit, the magnetic device of the second basic power unit, the first secondary rectifying circuit of the second basic power unit, the primary switch circuit of the second basic power unit, the primary switch circuit of the first basic power unit, the first secondary rectifying circuit of the first basic power unit, the magnetic device of the first basic power unit and the first positive output terminal pin of the first basic power unit are sequentially arranged on the circuit board along the first direction.

12. The power conversion module according to claim 11, wherein a structure of the magnetic device of the first basic power unit and a structure of the magnetic device of the second basic power unit are identical.

13. The power conversion module according to claim 1, wherein the first secondary rectifying circuit further comprises a first rectifier assembly and a second rectifier assembly, wherein the first rectifier assembly comprises a first rectifier element and a second rectifier element connected in parallel, and the first rectifier element and the second rectifier element of the first rectifier assembly are MOSFETs, wherein the second rectifier assembly comprises a first rectifier element and a second rectifier element connected in parallel, and the first rectifier element and the second rectifier elements of the second rectifier assembly are MOSFETs, wherein the first rectifier element of the first rectifier assembly and the first rectifier element of the second rectifier assembly are disposed on a first surface of the circuit board, and the second rectifier element of the first rectifier assembly and the second rectifier element of the second rectifier assembly are disposed on a second surface of the circuit board, wherein the projection of the first rectifier element of the first rectifier assembly on the first surface and the projection of the second rectifier element of the first rectifier assembly on the first surface are partially overlapped with each other, and the projection of the first rectifier element of the second rectifier element on the first surface and the projection of the second rectifier element of the second rectifier assembly on the first surface are partially overlapped with each other.

14. The power conversion module according to claim 1, wherein the first positive output terminal pin is disposed on the circuit board.

15. The power conversion module according to claim 2, wherein the first positive output terminal pin is electroplated on or embedded in the second magnetic cover of the magnetic device.

16. The power conversion module according to claim 3, wherein the first secondary rectifying circuit comprises a first rectifier assembly and a second rectifier assembly, wherein a first terminal of the first rectifier assembly is electrically connected with a first terminal of the second rectifier assembly, a second terminal of the first rectifier assembly is electrically connected with the first terminal of the first secondary winding, and a second terminal of the second rectifier assembly is electrically connected with the first terminal of the second secondary winding, wherein the first rectifier assembly, the second rectifier assembly, the first secondary winding and the second secondary winding are collaboratively formed as an electrically closed loop.

17. The power conversion module according to claim 16, wherein each of the first rectifier assembly and the second rectifier assembly includes at least one rectifier element.

18. The power conversion module according to claim 16, wherein the first secondary rectifying circuit further comprises an output capacitor, wherein a first terminal of the output capacitor is electrically connected with a center-tap point and a positive output terminal of the power conversion module, a second terminal of the output capacitor is electrically connected with the first terminal of the first rectifier assembly, the first terminal of the second rectifier assembly and a negative output terminal of the power conversion module.

19. The power conversion module according to claim 3, wherein there is a first voltage across the first terminal and the second terminal of the first secondary winding, and there is a second voltage across the first terminal and the second terminal of the second secondary winding, wherein a phase difference between the first voltage and the second voltage is 180 degrees.

20. The power conversion module according to claim 3, wherein the primary winding receives an AC voltage, wherein the AC voltage is a two-level voltage or a three-level voltage.

* * * * *